United States Patent
Blinn et al.

(10) Patent No.: US 10,768,774 B2
(45) Date of Patent: *Sep. 8, 2020

(54) BACKWARDS NAVIGATION IN FLEXIBLE-PAGE LAYOUT

(71) Applicant: SAP SE, Walldorf (DE)

(72) Inventors: Jan-Michel Blinn, Osthofen (DE); Annette Jann, Heidelberg (DE); Carlos Martinez Gomez, Heidelberg (DE); Carolin Seel, Heidelberg (DE); Denis Timur, Mannheim (DE); Janos Varadi, Ludwigsshafen (DE); Kai Richter, Mühltal (DE); Roman Rommel, Neustadt an der Weinstrasse (DE); Tina Rauschenbach, Mannheim (DE); Jamila Schon, Heidelberg (DE)

(73) Assignee: SAP SE, Walldorf (DE)

( * ) Notice: Subject to any disclaimer, the term of this patent is extended or adjusted under 35 U.S.C. 154(b) by 214 days.

This patent is subject to a terminal disclaimer.

(21) Appl. No.: 15/374,815

(22) Filed: Dec. 9, 2016

(65) Prior Publication Data

US 2018/0107347 A1 Apr. 19, 2018

Related U.S. Application Data

(63) Continuation of application No. 15/294,133, filed on Oct. 14, 2016, and a continuation-in-part of (Continued)

(51) Int. Cl.
*G06F 3/0481* (2013.01)
*G06F 3/0488* (2013.01)
(Continued)

(52) U.S. Cl.
CPC ........ *G06F 3/0481* (2013.01); *G06F 3/04886* (2013.01); *G06F 16/9577* (2019.01); *G06F 3/04842* (2013.01); *G06F 2203/04803* (2013.01)

(58) Field of Classification Search
CPC ............. G06F 3/0481; G06F 17/30873; G06F 3/04842; G06F 2203/04803; G06F 3/0483;
(Continued)

(56) References Cited

U.S. PATENT DOCUMENTS 5,933,140 A 8/1999 Strahorn et al.
6,008,809 A 12/1999 Brooks
(Continued)

*Primary Examiner* — Christopher J Fibbi
(74) *Attorney, Agent, or Firm* — Sterne, Kessler, Goldstein & Fox P.L.L.C.

(57) ABSTRACT

System, method, and computer program product embodiments describe back navigation features of a page. In an embodiment, a display device displays the page in a first layout, selected from a set of layouts associated with the page, for displaying a first content. The display device navigates from the first layout to one or more subsequent layouts, each subsequent layout selected from the set of layouts. The subsequent layouts include a second layout that concurrently displays the first content and a second related content in separate panels of the second layout. The display device stores a navigation sequence from the first layout through each of the subsequent layouts. Responsive to receiving a command to return to the first layout, the display device selects the first layout, from the stored navigation sequence, to navigate from the second layout to the first layout. Then, the page is rendered using the selected first layout.

20 Claims, 17 Drawing Sheets

Related U.S. Application Data application No. 15/294,138, filed on Oct. 14, 2016, now abandoned.

(51) Int. Cl.
  *G06F 16/957* (2019.01)
  *G06F 3/0484* (2013.01)

(58) Field of Classification Search
  CPC .......... G06F 3/04886; G06F 17/30905; G06F 16/9577
  See application file for complete search history.

(56) References Cited

U.S. PATENT DOCUMENTS

| | | | |
|---|---|---|---|
| 6,765,592 B1 | 7/2004 | Pletcher et al. | |
| 7,530,029 B2* | 5/2009 | Satterfield | G06F 9/451 |
| | | | 715/779 |
| 8,525,808 B1* | 9/2013 | Buening | G06F 3/041 |
| | | | 345/156 |
| 9,830,067 B1 | 11/2017 | Jitkoff | |
| 2002/0054141 A1 | 5/2002 | Yen et al. | |
| 2005/0210412 A1* | 9/2005 | Matthews | G06F 9/451 |
| | | | 715/835 |
| 2010/0138767 A1* | 6/2010 | Wang | G06F 3/0481 |
| | | | 715/769 |
| 2010/0306705 A1 | 12/2010 | Nilsson | |
| 2011/0016422 A1 | 1/2011 | Miyazawa et al. | |
| 2012/0011467 A1* | 1/2012 | Sung | G06F 3/0481 |
| | | | 715/788 |
| 2012/0144331 A1 | 6/2012 | Tolonen et al. | |
| 2012/0204125 A1 | 8/2012 | Shia et al. | |
| 2013/0151974 A1 | 6/2013 | Cho et al. | |
| 2013/0187861 A1* | 7/2013 | Lavallee | G06F 9/543 |
| | | | 345/173 |
| 2014/0096049 A1 | 4/2014 | Vonshak et al. | |
| 2014/0096158 A1 | 4/2014 | Chao | |
| 2014/0164990 A1* | 6/2014 | Kim | G06F 3/04817 |
| | | | 715/790 |
| 2014/0229888 A1* | 8/2014 | Ko | G06F 3/04886 |
| | | | 715/783 |
| 2015/0074589 A1 | 3/2015 | Pan et al. | |
| 2016/0313877 A1* | 10/2016 | Ha | G06F 3/0482 |
| 2018/0107632 A1 | 4/2018 | Blinn et al. | |

* cited by examiner

BACKWARDS NAVIGATION IN FLEXIBLE-PAGE LAYOUT

CROSS-REFERENCE TO RELATED APPLICATIONS

This application is related to and incorporates by reference U.S. patent application Ser. No. 15/294,138, filed Oct. 14, 2016, entitled "Backwards Navigation in Flexible-Page Layout" to Blinn et al., and U.S. patent application Ser. No. 15/294,133, filed Oct. 14, 2016, entitled "Flexible-Page Layout" to Blinn et al.

BACKGROUND

Users typically use a client, e.g., a browser, to access software applications over the Internet. The client provides a graphical user interface (GUI) to enable a user to access content from and navigate within the software applications. Current client GUIs only implement graphical elements that provide page-based navigation within and between the software applications. But this page-based navigation is inefficient because it requires the user to click through multiple pages to view desired content. Not only does this page-based navigation require the client to repeatedly open and close pages—which degrades user experience, but also it increases the number of queries and requests sent to a server hosting the software applications. These queries and requests increase the server's load, hog the server's processing bandwidth, and further degrade a responsiveness of the software applications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
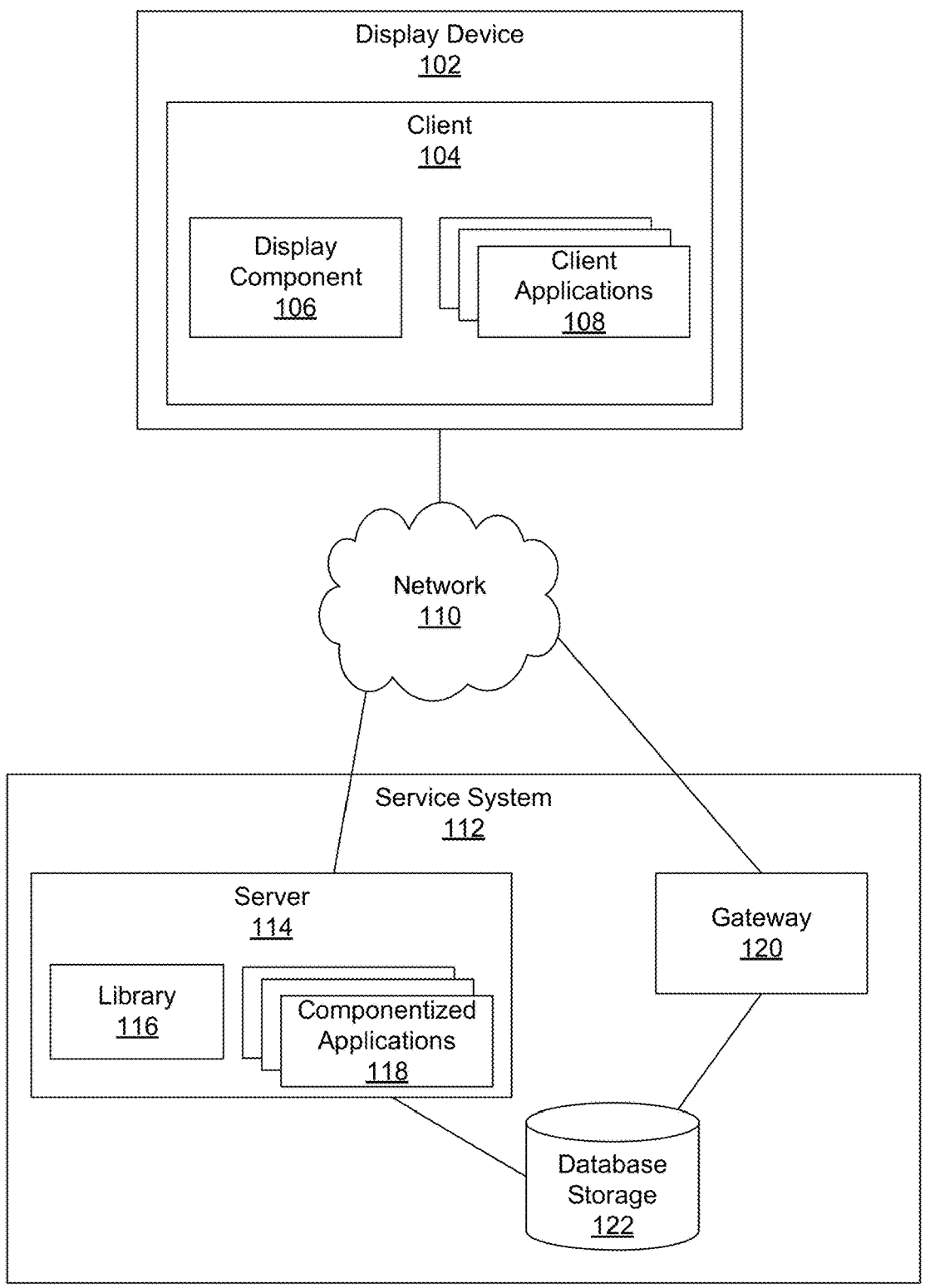
FIG. 1 is a block diagram of a system providing a page having a flexible-page layout, according to an example embodiment.

Provided herein are system, apparatus, device, method, computer program product embodiments, or combinations and sub-combinations thereof, for utilizing a page having a flexible layout, i.e., a flexible-page layout, for accessing content across multiple applications. In an embodiment, a display device displays, within a display area, a first content on a page associated with a set of layouts. The page uses a one-panel layout having one panel that encompasses the first content. Responsive to a selection of a portion of the first content within the one-panel layout used by the page, the display device receives a second content for displaying within the display area. This second content is associated with the first content. Upon receiving the second content, the display device renders the page using a two-panel layout, from the set of layouts, having a first panel that is vertically adjacent to a second panel to display the first and second content alongside each other, wherein the first and second panels respectively display the first and second content. Since this page is associated with a layout that can adapt based on requested content, this page uses a flexible-page layout. This first and second content may be retrieved or generated by separate applications.

In an embodiment, the page implements back navigation features to complement the forward navigation capabilities provided by the set of layouts. For example, the one-panel and two-panel layouts, described above, enables a user to forward navigate from the first content to related content such as the second content. Therefore, a display device provides the flexible-page layout to concurrently display related contents, which include related pieces of content displayed in separate panels of a layout from the set of layouts. Similar to how the second content is related to the first content, each related piece of content may be generated from a selection of a portion of a previously-generated related piece of content. In an embodiment, the display device navigates from a displayed layout of the page to subsequent layouts, from the set of layouts, for concurrently displaying the related contents responsive to determining corresponding selections of portions of content in previous layouts with respect to the subsequent layouts. In the above example, selecting a portion of the first content caused the display device to render the page using the two-panel layout to concurrently display the first content and related second content.

In an embodiment, the display device stores a navigation sequence from a displayed layout through each of the subsequent layouts. Responsive to receiving a command to return to a previously-navigated layout from a currently displayed layout, the display device selects the previously-navigated layout, from the stored navigation sequence, that corresponds to the received command. Then the display device renders the page using the selected layout, which is the previously-navigated layout. For example, the received command may be a selection of a back graphical user interface (GUI) element that, upon selection, causes the display device to render the page using the immediate previously-displayed layout. In another example, the received command may be a selection of a level from a hierarchical arrangement that displays the stored navigation sequence that causes the display device to render the page using a layout associated with the selected level. For example, the layout associated with the selected level may be the previously-navigated layout discussed above. The hierarchical arrangement, implemented in the page, is an effective mechanism for providing out-of-order backward navigation. In both of these examples, the display device renders the page using a previously-navigated layout that corresponds to the received command.

FIG. 1 is a block diagram of a system 100 that provides a page having a flexible-page layout, i.e., a flexibly-rendered layout, for presenting content from multiple software applications, according to an example embodiment. System 100 includes display device 102 that utilizes client 104 to communicate with service system 112 over network 110. Network 110 may be, for example, a LAN (Local Area network), MAN (metropolitan area network), WAN (Wide Area Network) such as the Internet, or any combination thereof. Network 104 may further utilize Ethernet communications, although other wired and/or wireless communication techniques, protocols and technologies can be used.

Traditional software applications are implemented within large monolithic on-premises software deployments, which may be complex to implement and maintain. The on-premises characteristic renders traditional software deployments difficult to scale and maintain due to a need to install new or upgraded hardware. Further, these large monolithic software deployments often have poor usability and performance due to overhead in providing unnecessary application functionality to each user. In contrast, service system 112 provides, to a user operating display device 102, various functionalities by managing and maintaining many, possibly thousands, of small, componentized applications running on various devices, servers, and network platforms. In an embodiment, the various functionalities provided by service system 112 include, for example, access to customer relationship manager (CRM), enterprise resource planning (ERP), supplier relationship management (SRM), and other products.

Service system 112 includes, in the illustrated example, server 114, gateway 120, and database storage 122. In an embodiment, to provide the various functionalities, server 114 includes library 110 and componentized applications 118, which may provide componentized functions. For example, such functions may be single tasks including, without limitation, display current employees, graph revenue trends, send inter-office email, add task to calendar, etc.

Library 110 contains instructions or data shared among componentized applications 118. For example, contents stored by library 110 may include various software modules that provide generic or shared functions across one or more componentized applications 118. Componentized applications 118 may encompass any combination of one or more of a web-based artifact, a native artifact, a hybrid artifact, a container-based artifact, etc.

In an embodiment, server 114 connects to database storage 122 to enable componentized applications 118 to interact with data from database storage 122. For example, componentized applications 118 may retrieve data from database storage 122 to display to the user via display device 102. In another example, componentized applications 118 may perform analytics on data retrieved from database storage 122 and present the result to display device 102. In an embodiment, componentized applications 118 may send queries to database storage 122 to retrieve data or to perform analytics for presenting on a screen of display device 102.

In an embodiment, server 114 sets up a communication path between display device 102 and database storage 122 via gateway 120. By setting up this communication path, display device 102, particularly client 104, may access data or analytics capability of database storage 122 through gateway 120 instead of server 114.

In an embodiment, each of the components, such as server 114, within service system 112 is implemented by one or more on-premises servers, one or more cloud-based servers, or a combination thereof. In an embodiment, server 114 is implemented as front-end servers and back-end servers, each type of server providing separate functionality. For example, front-end servers may implement templates for generating componentized applications 118. In an example, front-end servers may implement the graphical user interface (GUI) logic of componentized applications 118 while back-end servers may implement the corresponding logic and functionality provided by componentized applications 118. In an example, back-end servers may include various analytics engine for interacting with componentized applications 118 and database storage 122.

Display device 102 includes client 104 for accessing the functionalities of componentized applications 118 provided by service system 112. Display device 102 is any computing device having a screen for displaying content and a processor for facilitating a user's interactions with service system 112 providing various functionalities. For example, display device 102 includes, but is not limited to, a desktop computer, a mobile device, a laptop, a smart watch, a tablet, etc. The displayed content may be, for example, data retrieved from database storage 122 or analytics performed on retrieved data.

Client applications 108 may encompass any combination of one or more of a web-based artifact (e.g., a browser), a native artifact downloaded from service system 112, a hybrid artifact, a container-based artifact, a mobile application downloaded from service system 112, etc. To interact with service system 112, client 104 includes display component 106 and client applications 108.

Display component 106 is display logic loaded from service system 112 via network 110. In an embodiment, the display logic includes GUI elements that specify controls for navigating among content generated or retrieved by one or more client applications 108. These GUI elements may also specify how content from one or more client applications 108 is to be displayed by client 104. In an embodiment, client 104 submits a request to download display component 106 from service system 112. For example, the request may be a submitted Uniform Resource Locator (URL), which may utilize the Hypertext Transfer Protocol (HTTP) or encrypted HTTP, e.g., HTTPS. When service system 112 authorizes the request, client 104 downloads display component 100.

In an embodiment, client 104 operates one or more client applications 108 on display device 102. Client applications 108 correspond to componentized applications 118 maintained on server 114. For example, client applications 108 may be an exact copy or a version of respective componentized applications 118. Versions may include, without limitation, a selection of functionality or different UI or GUI elements from componentized applications 118 depending on a type of display device 102 or client 104. In an embodiment, these UI or GUI elements specify how content associated with respective client applications 108 is to be displayed.

In an embodiment, a user operating client 104 work with client applications 108 that are selected based on the user's role, a selected domain, or customizations as captured by client 104. Therefore, client applications 108 may be a collection of pre-defined, focused applications that display component 106 makes visible and available to the user. In an embodiment, the available domains, customizations, or roles to a user are limited based on options relevant to the user's duties, which may be identified and controlled by access credentials, operational rules/rights/etc. (through for example an Access Control List (ACL)), among other indications.

By implementing versions or copies of componentized applications, client applications 108 provide targeted functionality that are relevant to the user operating client 104. In an embodiment, client 104 presents client applications 108 via display component 106 in such a way as to provide a better user experience, reduce inefficient navigation among client applications 108, and thereby increasing user productivity across various operating environments of display device 102. The display logic and operations of display component 106 are described below with respect to FIGS. 2-11. While the display logic and operations in the following embodiments of FIGS. 2-11 will be described with respect to the devices and components from FIG. 1, such embodiments are not limited to these devices and components.

Figure 2:
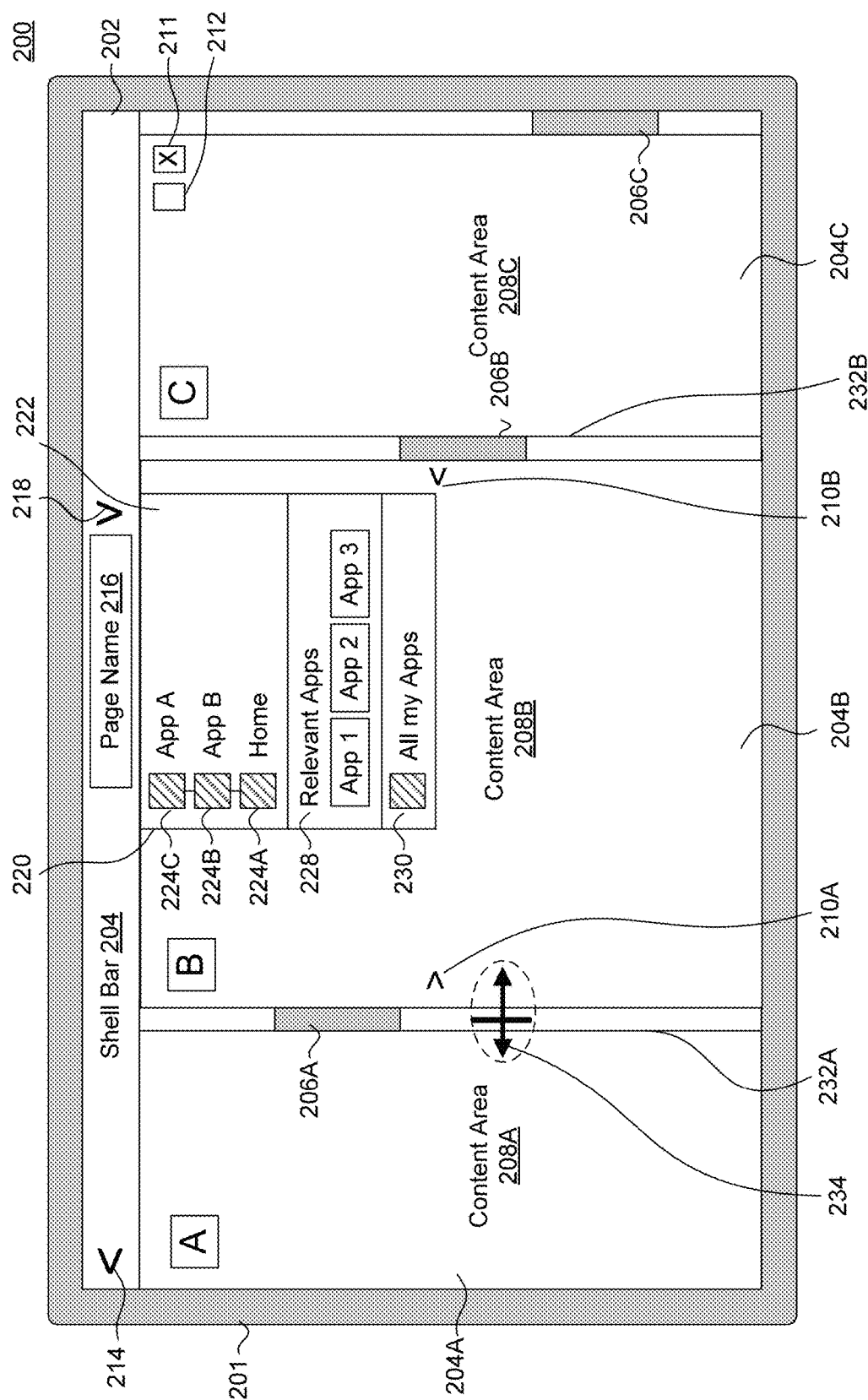
FIG. 2 is a diagram illustrating an example flexible-page layout for a page displayed on a display device, according to an example embodiment.

FIG. 2 illustrates a diagram 200 showing a page having a flexible-page layout 202 for displaying content on a screen of display device 201, according to an example embodiment. In an embodiment, display device 201 is an example of display device 102 operating client 104 that displays flexible-page layout 202.

In an embodiment, flexible-page layout 202, as implemented by display component 106, is flexible because a page is subdivided into multiple panels and the number of panels within the page may change depending on selections of a user. As shown, display component 106 presents flexible-page layout 202 as a three-panel layout having a widest middle panel. These panels are labeled as leftmost panel 204A, middle panel 204B, and rightmost panel 204C. Also shown, panels 204A-C may be vertically adjacent to each other and may take up the entire display area, e.g., screen, of display device 201.

In an embodiment, panels 204A-C each include respective content areas 208A-C and scroll bars 206A-C. In an embodiment, content areas 208A-C represent content retrieved or generated by separate client applications 108 associated with panels 204A-C. For example, content areas 208A-C may correspond to three separate and distinct client applications 108. In an embodiment, each of content areas 208A-C is interrelated with each other. For example, content areas 208B-C are presented based on selections of portions of content areas 208A-B, respectively. But, each of panels 204A-C may operate concurrently and independently of each other based on interactions with underlying client applications 108 interfaced with respective panels 204A-C and respective content areas 208A-C.

In an embodiment, one or more of the panels, e.g., panel 204A, in a flexible-page layout, e.g., flexible-page layout 202, may be undocked from the flexible-page layout for display in a separate browser window or tab in a browser window. In an embodiment where multiple monitors are used, the undocked panel, e.g., panel 204A, may be displayed on a separate monitor than that displaying the flexible-page layout including the other panels. In an embodiment, an undocked panel displayed in a separate or tab in a browser window can be re-docked to the flexible-page layout.

In an embodiment, due to the independent operations of panels 204A-C, corresponding scroll bars 206A-C also operate independently. For example, a user operating scroll bar 206A may scroll up or down within panel 204A to change portions of content displayed in content area 208A while scroll bars 206B-C in other panels 204B-C remain unmoved. In an embodiment, scroll bars 206A-C may be transparent until a user hovers a location indicator, e.g., a mouse pointer, or touches content areas 208A-C or scroll bars 206A-C near the right edge of respective panels 204A-C.

In an embodiment, display component 106 implements flexible-page layout 202 that includes shell bar 204. Shell bar 204 provides a persistent interface, e.g., proximate to the upper edge of display device 201, that contains navigation GUI controls. In an embodiment, display component 106 implements shell bar 204 that includes back GUI element 214 for backwards navigation to an immediate previously-navigated layout. For example, back GUI element 214 may be depicted within shell bar 204 in an upper left location. When display component 106 detects that a user selected back GUI element 214, display component 106 provides sequential backward navigation through previously displayed layouts, then lastly displaying a previously-opened page. The displayed layouts may be selected from the set of possible layouts associated with flexible-page layout 202. In an embodiment, since panels 204A-C are part of the same page in flexible-page layout 202, display component 106 closes each of panels 208A-C and routes to a previously-opened page that does not include content from content area 208A-C.

In an embodiment, display component 106 displays shell bar 204 that includes page name GUI element 216 representative of the currently-opened page. For example, page name GUI element 216 may display a name of the application providing the displayed content, such as content A in content area 208A. In an embodiment, page name GUI element 216 operates as a navigation menu button because display component 106 presents a pop-up navigation menu 220 when page GUI element 216 is selected by, e.g., mouse or touch, or hovered by, e.g., a mouse. In an embodiment, in addition or alternatively, display component 106 presents navigation menu 220 upon detecting a selection of the details icon 218 associated with page name GUI element 216.

In an embodiment, navigation menu 220 includes selectable entries in the navigation history region 222, relevant applications region 228, and all my applications region 230 for navigating to other applications and associated page layouts. In an embodiment, navigation history region 222 presents a user's navigation history in a vertical hierarchical arrangement where entries 224 that are more-recently navigated are placed towards the top of the arrangement. For example, the most-recently navigated entry, i.e., entry 224C, is the top level and the least-recently navigated entry, entry 224A, is the bottom level. Other hierarchical arrangements are possible. For example, the user's navigation history may be presented in a horizontal orientation. In another example, more-recently navigated entries may be placed towards the bottom levels. In an embodiment, each of entries 224 has an associated icon and descriptive text. For example entry 224A, titled "Home," represents the earliest navigated and displayed page. Likewise, entry 224C, titled "App B," may represent the most-recently navigated page, i.e., the immediate previously-navigated page.

In an embodiment, entries 224 are also associated with respective layouts that were previously displayed. Upon receiving a user's selection of entry 224C, for example, a selection of the associated icon or associated descriptive text "App B," display component 106 renders the page to the previously-navigated layout associated with entry 224C. For example, display component 106 may render flexible-page layout 202 as a page having a two-panel layout concurrently displaying contents A and B. In an embodiment, as further described with respect to FIG. 9B, navigation menu 220 includes entries 224 that represent unique single-panel views of navigated layouts.

In an embodiment, relevant applications 228 include selectable entries representative of applications that a user can directly open without having to return to a default page like a "Home" page. In an embodiment, these selectable entries include representations, e.g., icons, of applications related to concurrently displayed content, in the example shown in FIG. 2, contents A, B, or C. In an embodiment, these selectable entries include representations of a number of applications most frequently accessed by the user operating display device 201.

In an embodiment, all my applications 230 include a selectable entry that upon user selection, causes display component 106 to present a pop-up applications menu for searching any application associated with the user operating display device 201. As described with respect to FIG. 1, these applications are componentized applications assigned to the user based on the user's customizations, the user's roles, the user's authorizations, among other user-related criteria. In an embodiment, all my applications region 230 and a subsequently-opened pop-up applications menu enables the user to search for his or her applications without needing to close currently-displayed flexible-page layout 202 and to navigate back to a "Home" page.

In an embodiment, display component 106 implements flexible-page layout 202 that includes toggle GUI element 212. For example, toggle GUI element 212 may be depicted within a rightmost panel, such as rightmost panel 204C, in a flexible-page layout having two or more displayed panels. In an embodiment, one or more panels 204A-C may each include a respective toggle GUI element. When display component 106 detects that a user selected toggle GUI element 212, display component 106 switches from a multi-panel view of flexible-page layout 202 to a single panel view showing only the content associated with the panel with toggle GUI element 212, as further described with respect to FIG. 7. Similarly, upon reselection of toggle GUI element 212 while in the single panel view, display component 106 switches back to a multi-panel view of flexible-page layout 202. In an embodiment, the single panel view of the page limits the set of layouts to a single permitted layout, for example, a one-panel layout, for displaying content. For example, regardless of a type of display device 201, a physical orientation of display device 201, or a display or screen width of display device 201, the single panel view displays content within the single permitted layout, such as the one-panel layout.

In an embodiment, display component 106 implements close panel GUI element 211 within a rightmost panel, such as rightmost panel 204C, in flexible-page layout 202 having two or more displayed panels. Upon receiving a user's selection of close panel GUI element 211, display component 106 closes the panel associated with close panel GUI element 211. For example, display component 106 may close panel 204C and terminate a connection to the application presenting content C displayed in content area 208C.

In an embodiment, display component 106 implements flexible-page layout 202 that includes one or more panel-width adjustment GUI elements 210A-B to adjust widths of adjacent panels. Panel-width adjustment GUI elements 210A-B are implemented within specific panels 204A-C. In an embodiment, display component 106 determines the specific panels 204A-C based on which layouts are permitted by flexible-page layout 202. As shown, panel 204B includes panel-width adjustment GUI elements 210A-B that. In an embodiment, upon detecting a predetermined user operation on one of panel-width adjustment GUI elements 210, display component 106 re-rendering flexible-page layout 202 in another layout associated with display device 201, as further described with respect to FIG. 6. For example, the predetermined user operation may be a click or tap selection by the user.

In an embodiment, display component 106 implements flexible-page layout 202 that includes splitter line indications 232 within specific panels 204. In addition to providing a visual separation between adjacent panels 204, splitter line indications 232 are GUI elements that may house respective scroll bars 206 or respective splitter indication icon 234. In an embodiment, display component 106 determines whether one or more of panels 204A-C implement a splitter line indication 232 that includes splitter indication icon 234 based on which layouts are permitted by flexible-page layout 202.

In an embodiment, splitter indication icon 234 may be a draggable version of the selectable panel-width adjustment GUI element 210. In an embodiment, display component 106 displays splitter indication icon 234A upon detecting that a mouse pointer is hovering over splitter line indication 232A, or that on touch devices, the user presses and holds on any portion of splitter line indication 232A. In an embodiment, because splitter indication icon 234 is displayed upon detecting and monitoring a user's actions over splitter line indication 232, there should be at most one splitter indication icon 234, e.g., splitter indication icon 234A, displayed in flexible-page layout 202 at any instance in time.

In an embodiment, when a portion of one of splitter line indications 232 is selected and held, e.g., by touch or mouse, splitter indication icon 234 provides a visual icon that allows the user to drag the splitter line indication 232 left or right to change the corresponding width of adjacent panels 204. In an embodiment, display component 106 limits changing the width of panels in certain directions, e.g., enlarge a panel width that is already displayed at a maximum size, or reduce a panel width that is already displayed at a minimum determined size. In each of these cases, splitter indication icon 234 displays associated arrow indications for the allowable actions according to the panel size, location, and adjacent panel width according to permitted layouts of flexible page layout 202.

For example, as shown, splitter indication icon 234A displays a double-sided arrow to indicate that splitter line indication 232A can be dragged left to increase the width of panel 204B or dragged right to increase the width of panel 204A. Alternatively, splitter indication icon 234A may display only a left arrow to indicate that splitter line indication 232A cannot be dragged right to increase the width of panel 204A. Similarly, splitter indication icon 234A may display only a right arrow.

Figure 10:
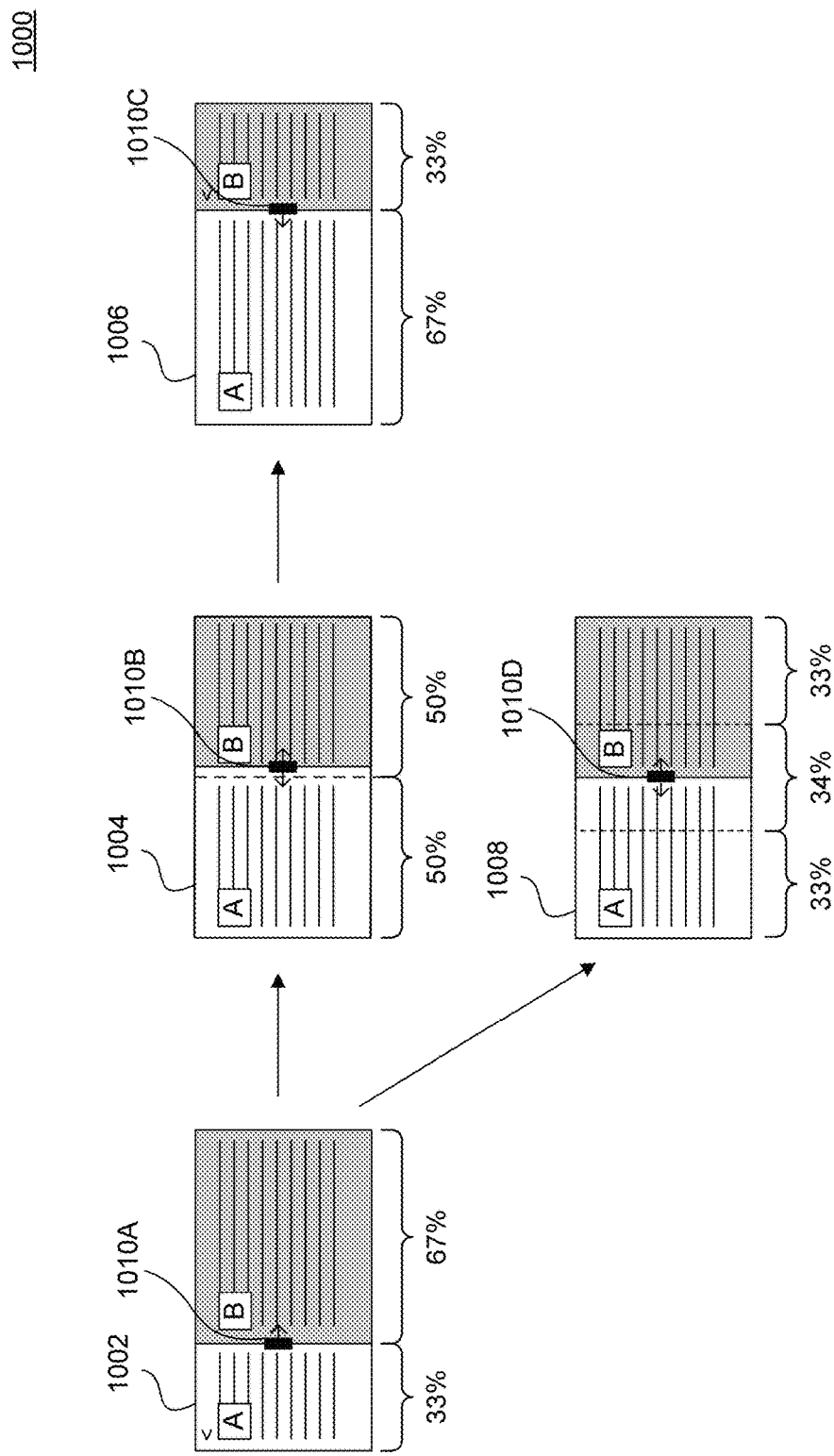
FIG. 10 is a diagram illustrating how a splitter indication icon permits panel-width adjustment within a page having a flexible-page layout, according to an example embodiment.

In an embodiment, upon detecting a predetermined user operation on splitter indication icon 234, display component 106 re-renders flexible-page layout 202 in a variable layout, as further described with respect to FIG. 10. For example, the predetermined user operation may be a drag-and-release operation via a mouse input or user's touch detected on a touch screen. In an embodiment, the width of adjacent panels is variably adjustable within a range of widths by dragging, (e.g., selecting and holding), and releasing splitter indication icon 234. For example, display component 106 enables a user using a pointer device, e.g., mouse, or touch on a touch device to drag splitter indication icon 234 to change a width of panel 204A between, e.g., 33% to 67% of the width of flexible-page layout 202. As the width of panel 204A increase, the width of panel 204B concurrently decreases.

In an embodiment, upon detecting a predetermined user operation on splitter indication icon 234, display component 106 re-renders flexible-page layout 202 in a layout, from the set of layouts, as further described with respect to FIG. 10. For example, the predetermined user operation may be a drag-and-release operation via a mouse input or user's touch detected on a touch screen. In an embodiment, upon receiving the drag-and-release operation among other types of predetermined user operations, display component 106 snaps splitter line indication 232 is to a predetermined location and consequently, the widths of adjacent panels 204 are adjusted. In an embodiment, display component 106 determines the predetermined location according to the screen size of display device 201, device orientation, or browser window representation of flexible-page layout 202. In an embodiment, the predetermined location corresponds to a permitted layout associated with flexible-page layout 202. For example, based on the released location of splitter indication icon 234, display component 106 re-renders flexible-page layout 202 to a layout having a corresponding splitter line indication 232 closest to the location of the released splitter indication icon 234.

Figure 3:
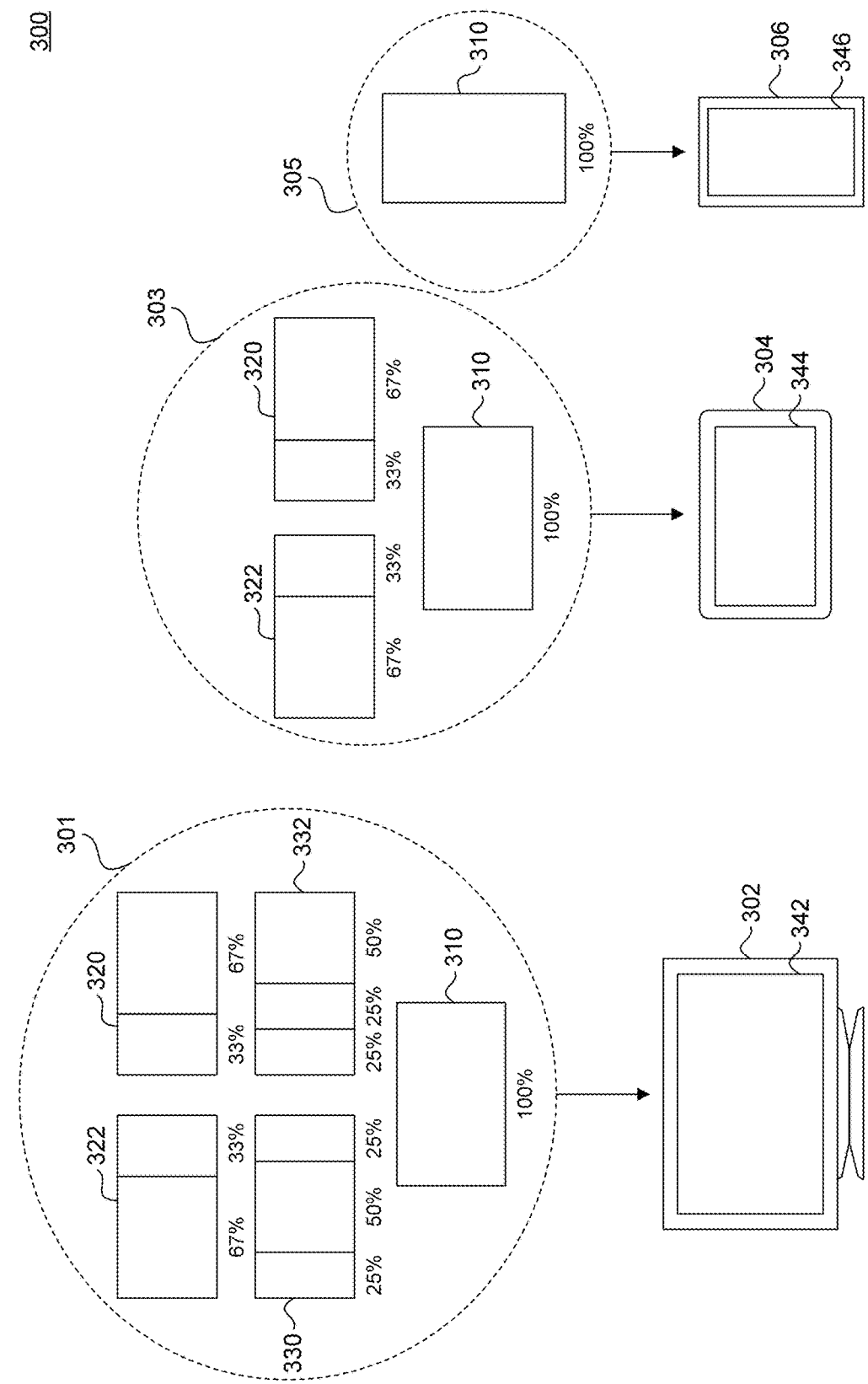
FIG. 3 is a diagram illustrating possible layouts for a page rendered by a display component within a flexible-page layout based on a display device, according to an example embodiment.

FIG. 3 is a diagram 300 showing possible layouts 310-332 rendered by display component 106 within flexible-page layouts 342-346 for each of display devices 302, 304, and 306, according to an example embodiment. Each of display devices 302, 304, and 306 may be an example of display device 102 from FIG. 1.

In an embodiment, display device 306 is a device having a small display area, e.g., a small screen width or display width. For example, display device 306 may be a smartphone or a wearable device, such as a smart watch. Due to a device type or limited display or screen width of display device 306, flexible-page layout 346 managed by display component 106 is limited to a set of layouts 305. For example, the set of layouts 305 include a one-panel layout 310 where the single panel takes up 100% of the width of flexible-page layout 346.

In an embodiment, display device 304 is a device having a moderate display area, e.g., a moderate screen width or display width. For example, display device 304 may be a tablet, a mobile device having a large screen smartphone, etc. Due to a device type or limited display or screen width of display device 304, flexible-page layout 344 managed by display component 106 is limited to a set of layouts 303. For example, the set of layouts 303 includes one-panel layout 310 and two-panel layouts 320-322. As shown, two-panel layout 320 includes a left panel and a wider right panel. For example, the left and right panels take up 33% and 67% of the width of flexible-page layout 304, respectively. Also shown is two-panel layout 322 including a right panel and a wider left panel. For example, the left and right panels take up 67% and 33% of the width of flexible-page layout 344, respectively.

In an embodiment, display device 302 is a device having a large display area, e.g., a large screen width or display width. For example, display device 302 may be a desktop computer, a monitor connected to a computing device, a laptop, etc. Due to a device type or limited display or screen width of display device 302, flexible-page layout 342 managed by display component 106 is limited to a set of layouts 301. For example, the set of layouts 301 includes one-panel layout 310, two-panel layouts 320-322, and three-panel layouts 330-332. As shown, three-panel layout 330 includes a leftmost panel, a widest middle panel, and a rightmost panel. For example, the leftmost, middle, and rightmost panels take up 25%, 50%, and 25% of the width of flexible-page layout 342, respectively. Also shown is three-panel layout 332 including a leftmost panel, a middle panel, and a widest rightmost panel. For example, the leftmost, middle, and rightmost panels take up 25%, 25%, and 50% of the width of flexible-page layout 342, respectively.

In an embodiment, display component 106 controls which layouts are included in the set of possible layouts 301, 303, and 305 for each flexible-page layouts 342, 344, and 346, respectively. Display component 106 selects the layout types for displaying content based on one or more of the following attributes: a type of display devices 302, 304, or 306, a physical orientation of display devices 302, 304, or 306, a width of the display or screen area of display device 302, 304, or 306, or a combination thereof. In an embodiment, based on these attributes, display component 106 limits the maximum number of permitted panels to be displayed within flexible-page layouts 302, 304, and 306. The above ratios or percentages of the widths of each panel are not limited to the values presented here and other values can be used. In an embodiment, some or all of these panel values are variable via dragging splitter indication icon 234 of FIG. 2 as described above. In an embodiment, some or all of these panel values are fixed and cannot be adjusted by a user.

In an embodiment, display component 106 selects the layouts to include in the set of possible layouts 342, 344, and 346 in a responsive manner. For example, display component 106 may receive an indication from a display device that an attribute, such as a physical orientation, has changed. Upon receipt of this indication, display component 106 reselects the layouts to include in the set of possible layouts. In an embodiment, display component 106 redetects a width of the display area of the client or display screen of the display device to make its reselection.

Figure 4:
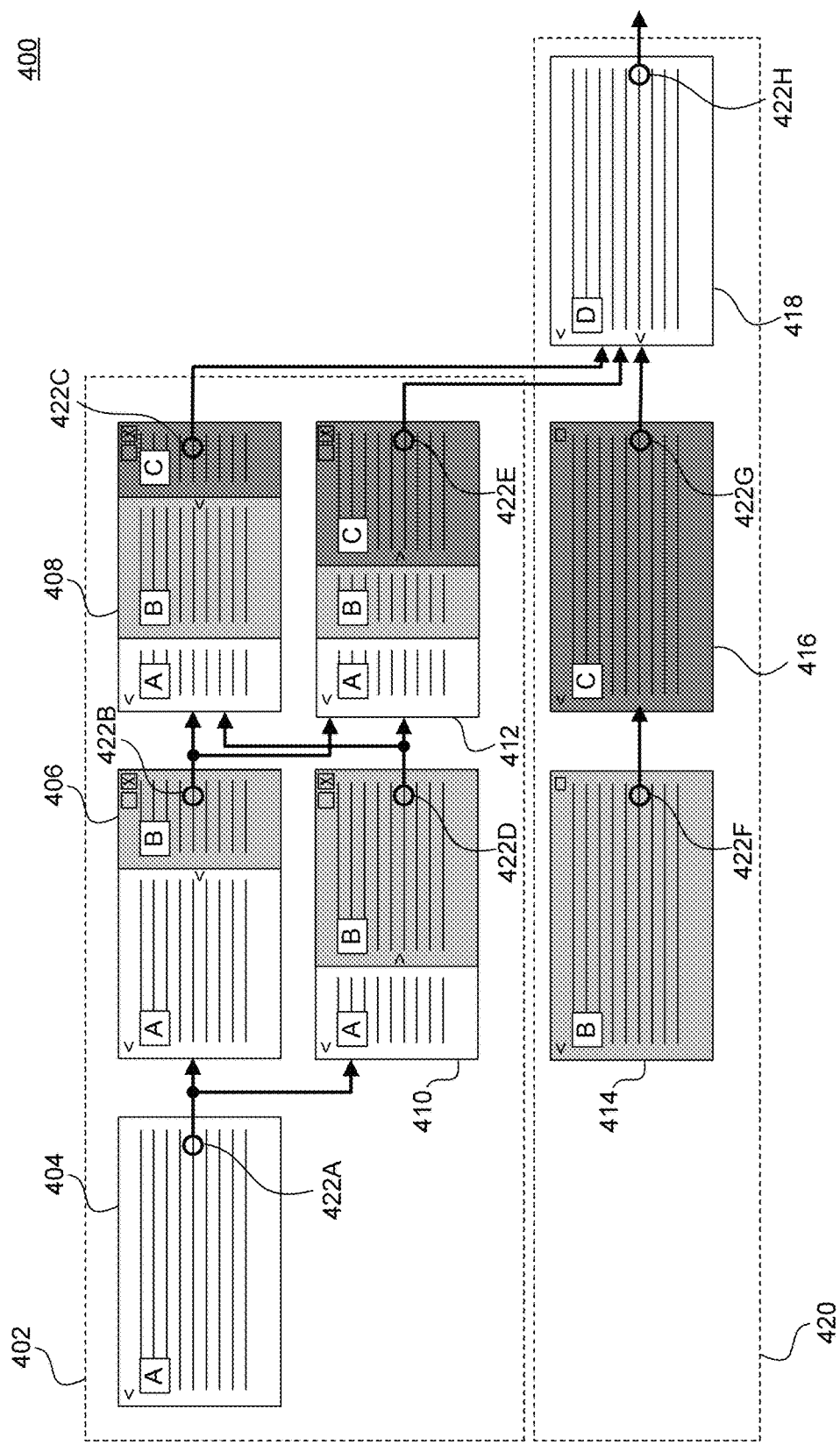
FIG. 4 is a diagram illustrating forward navigation in a page having a flexible-page layout, according to an example embodiment.

FIG. 4 is a diagram 400 illustrating forward navigation in a page having a flexible-page layout, according to an example embodiment. In an embodiment, layout group 402, including layouts 404-412, permits a multi-panel view to concurrently display related content, such as two or more of contents A, B, or C. In contrast, layout group 420, including layouts 414-418, permits a single-panel view of content. The page implemented using the flexible-page layout may include one-panel layout 310 (e.g., layouts 404 and 414-418), two-panel layouts 320-322 (e.g., layouts 406 and 410), or three-panel layouts 330-332 (e.g., layouts 408 and 412). Layouts 404-418 show one or more content areas 208A-C, back GUI element 214, one or more panel-width adjustment GUI elements 210A-B, and toggle GUI element 212, each of which is described with respect to FIG. 2. One or more of layouts 404-418 may also implement scroll bar 206, splitter line indication 232, or splitter indication icon 234, as described with respect to FIG. 2. As shown, panels display content A, B, C, or a combination thereof. As described with respect to FIGS. 1-2, content A, B, and C may be interrelated information that corresponds to separate client applications 108.

In an embodiment, display component 106 controls which of layout types 310-332, as described with respect to FIG. 3, to use in flexibly rendering the page as presented on, for example, display device 102, when a user requests access to new content. As shown, a display device providing the flexible-page layout may be a computing device having a large display area, e.g., display device 302 from FIG. 3. Therefore, each of the possible layouts 404-418 correspond to one of the layouts in the set of layouts 301 associated with display device 302. In an embodiment, the permitted set of layout, such as set of layouts 301, depends on a type of the display device, e.g., having a large screen, as well as the specific application generating the content, e.g., content A. Each of the panels within possible layouts 404-418 may include selectable portions 422 of content. In an embodiment, selectable portions 422 may be hyperlinks or include text indicating a functionality to be provided by a separate one of client applications 108.

In an embodiment, responsive to receiving a user's selection of selectable portion 422A of content A in single panel layout 404, display component 106 subsequently displays a second single panel containing corresponding content B related to the selected portion 422A. Similarly, responsive to receiving a user's selection of selectable portion 422B or 422D, for example, in the second single panel, display component 106 subsequently displays a third single panel containing corresponding content C related to the selected portion 422B or 422D from the second single panel. In an embodiment, continuous selection of the back GUI element, described with respect to FIG. 2, in layouts 404-418 provides sequential backward navigation through the previously displayed layouts.

In an embodiment and as shown, when display component 106 detects that a user has selected one of client applications 108, display component 106 depicts content A within a panel of one-panel layout 404. In an embodiment, content A may be generated by or retrieved by the user-select client application. As shown, one-panel layout 404 may include selectable portion 422A.

In an embodiment, display component 106 detects that the user has selected selectable portion 422A. Responsive to the user's selection, display component 106 receives content B for displaying alongside content A. For example, as described with respect to FIGS. 1-2, display component 106 may download one of client applications 108, from service system 112, that correspond to a respective one of componentized applications 118. Then, the downloaded client application may generate or retrieve content B. In an embodiment, display component 106 displays previous content A and new content B concurrently in one of two-panel layouts 406 and 410. In an embodiment, display component 106 determines which of the two-panel layouts 406 and 410 to select based on available layouts associated with the page, a type of selected portion 422A, selected portion 422A itself, or a combination thereof. For example, selected portion 422A in content A may result in a graph to be presented in content B. In this case, display component 106 may be programmed to select two-panel layout 410, which has a larger width for the right panel to display the graph in content B.

In an embodiment, each of two-panel layouts 406 and 410 includes respective selectable portions 422B and 422D of content B. In an embodiment, display component 106 detects that the user has selected either selectable portion 422B or 422D. Responsive to the user's selection, display component 106 receives content C for displaying alongside content A and B. Similar to receiving content B, display component 106 may instruct a different client application to retrieve or generate content C for displaying within one of three-panel layouts 408 or 412. In an embodiment, display component 106 determines which of the three-panel layouts 408 and 412 to select based on available layouts associated with the page, a type of selected portion 422B, selected portion 422B itself, or a combination thereof.

In an embodiment, a user's selection of selectable portions of content within content A corresponds to a client application associated with content B. Therefore, content C will not be generated. Instead, upon detecting the user's selection of a portion within content A, display component 106 instructs the client application associated with content B to update information within content B.

In an embodiment, each of three-panel layouts 408 and 412 includes respective selectable portions 422C and 422E of content C. In an embodiment, display component 106 detects that the user has selected either selectable portion 422C or 422E. Responsive to the user's selection, display component 106 receives content D for displaying. Similar to receiving content D, display component 106 may instruct a different client application to retrieve or generate content D for displaying.

In an embodiment, possible layouts within a flexible-page layout may be restricted to a maximum number of panels based on one or more attributes of the display device, as described with respect to FIG. 2 above. As shown, for example, layouts in layout group 402, permitting multi-panel view of related content, may be limited to a maximum of three adjacent panels. In an embodiment, additional content, such as content D, may be presented in a single-panel view, such as one-panel layout 418 in layout group 420. Therefore, in an embodiment, each of the user's selection causes display component 106 to generate new content to be concurrently displayed in a new panel generated to the right of the currently-generated panels until the maximum number of panels, e.g., three, is reached.

In an embodiment, display component 106 controls how to display content when just a single-panel view of the flexible-page layout is permitted, as shown in layout group 420, as a user requests access to new content. As shown, a display device operating present content A and related contents B, C, and D within a single-panel layout, such as the one-panel layouts 414-418. Each of the panels within the one-panel layouts 414-418 may include selectable portions 422F-G of content, respectively.

In an embodiment, display component 106 detects that the user has selected selectable portion 422F of content B. Responsive to the user's selection, display component 106 receives content C to display. For example, as described with respect to FIGS. 1-2, display component 106 may download one of client applications 108, from service system 112, that correspond to a respective one of componentized applications 118. Then, the downloaded client application may generate or retrieve content C. In an embodiment, display component 106 displays content C in one-panel layout 416 since only a single-panel view of content and related content is permitted. Similarly, when display component 106 detects the user's selection of selectable portion 422G, display component 106 receives content D and displays content D in another single-panel layout, i.e., single-panel layout 418 that permits a single-panel view of content. In an embodiment, in contrast to layouts 404-412 that are part of the same page, layouts 414-418 are separate pages corresponding to content B, C, and D respectively.

In an embodiment, the single-panel view as shown in group of layouts 420 operates similar to a full-screen option provided in current browsers. Unlike current browsers, however, the single-panel view does not necessarily expand the display area of content in a page to fill up the device screen. The single-panel view expands the display area of content within one panel, from the multi-panel view of the group of layouts 402, to fill up the entire page. Hence, the page has a flexible-page layout that not only permits a multi-panel view of related content but also permits maximizing display area of content-of-interest in a single-panel view. In an embodiment, the single-panel view is provided within one panel that fills up the device screen.

In an embodiment, display component 106 permits a client, e.g., browser, operating the page to bookmark any displayed layout as a user navigates from one layout to the next. To do this, display component 106 associates each possible layout of the page with a corresponding Uniform Resource Locator (URL). For example, display component 106 may assign each of layouts 404-418 a unique URL, which may be viewable from the client. When the user bookmarks, for example, the page having layout 406, he or she may later access the bookmarked page directly without first accessing page having layout 404 and then subsequently accessing layout 406 via, e.g., selecting portion 422A.

In an embodiment, the unique URL corresponds to the layout and its attributes. These attributes may include, for example, the number of panels for display, associated content in each panel, applications generating each of the content, a close panel GUI element in a rightmost panel, or one or more panel-width adjustment GUI elements. These attributes are discussed above with respect to FIG. 2. Therefore, a user may access, for example, two-panel layout 606 by accessing its corresponding URL. In this example, the close-panel GUI element may enable the user to omit the panel displaying content B. In an embodiment, the displayed layout, e.g., two-panel layout 606, includes a panel-width adjustment GUI element. For example, two-panel layout 606 may include a panel-width adjustment GUI element in the panel displaying content A that upon a user's selection, causes display component 106 to select two-panel layout 410 that prioritizes content B.

In an embodiment, by assigning each layout with a unique corresponding URL, display component 106 provides the capability for a user to share the specific page with other users. For example, the user can copy or forward the URL to other users. In an embodiment, the URL can be sent via email or other communication platforms. In an embodiment, only specific users can access the URL. For example, when the user attempts to access the URL, the user may be prompted to enter credentials, e.g., username and password, that need to be verified by a service system, such as service system 112.

Figure 7:
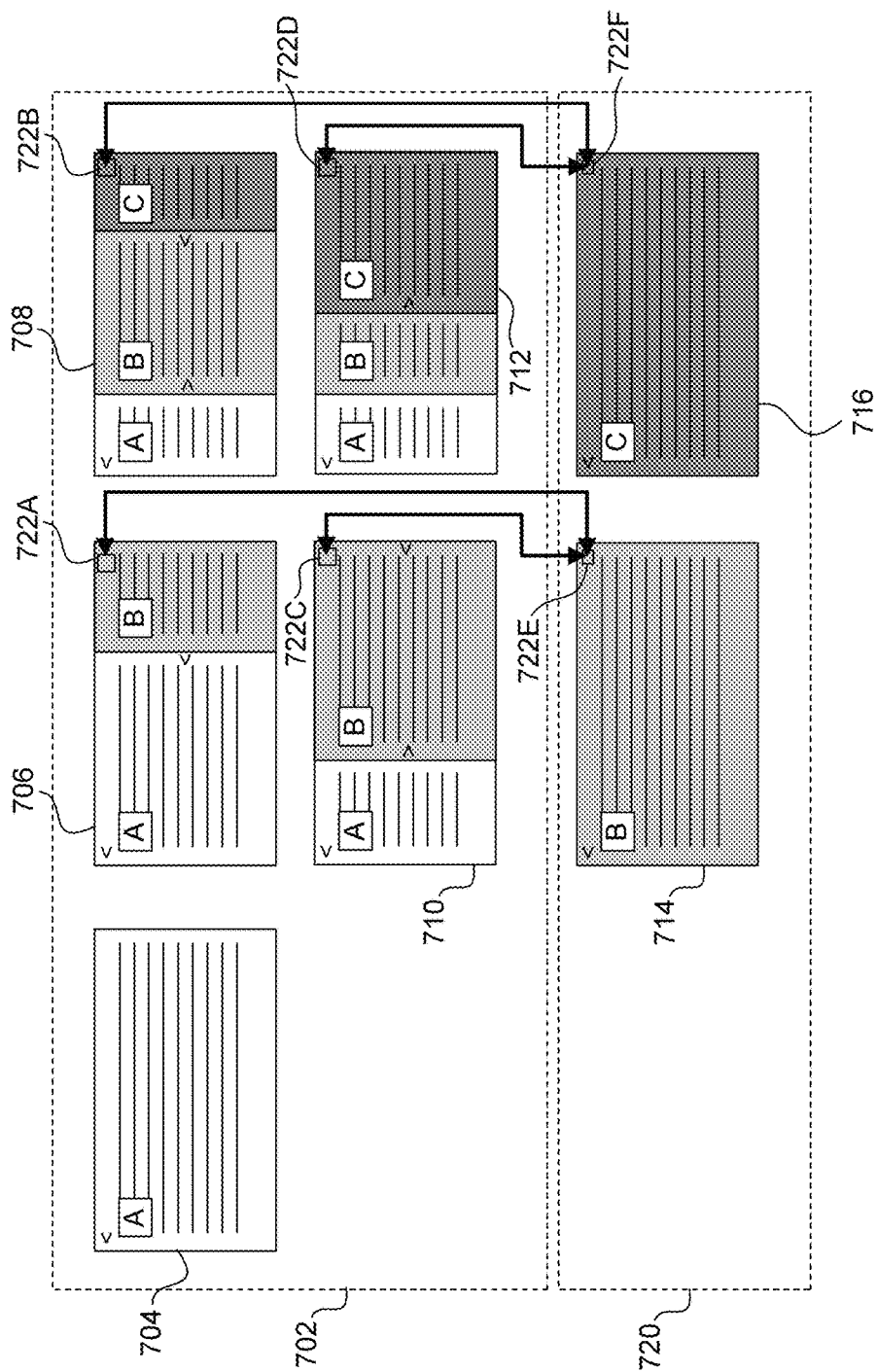
FIG. 7 is a diagram illustrating how to toggle within a page having a flexible-page layout between multi-panel view and single-panel view, according to an example embodiment.

FIG. 7 is a diagram 700 illustrating how to toggle within a page having a flexible-page layout between a multi-panel view and a single-panel view, according to an example embodiment. In an embodiment, the groups of layouts 702 and 720 correspond to layout groups 402 and 420 (exempting one-panel layout 418) from FIG. 4, respectively. Therefore, diagram 700 also represents one embodiment for how a user would navigate from a multi-panel view, e.g., either of two-panel layouts 406 or 410 in FIG. 4, to a single-panel view, e.g., one-panel layout 414.

In an embodiment, one or more layouts in layout groups 502 and 520 implement respective toggle GUI elements 722A-F, which correspond to toggle GUI element 212 of FIG. 2. As shown, the page having a flexibly-rendered layout can concurrently display related content retrieved or generated by multiple client applications, such as client applications 108 of FIG. 1, in a multi-panel view. This multi-panel view may include, for example, displaying related content in two-panel layouts 706 and 710, and three-panel layouts 708 and 712. Further, in an embodiment, toggle GUI elements 722A-F are implemented in a rightmost panel within each of the multi-panel layouts.

In an embodiment, responsive to display component 106 detecting that either toggle GUI element 722A or 722C has been selected, display component 106 switches presentation of content from the multi-panel view of two-panel layouts 706 or 710 (depending on selected toggle GUI element 722A or 722C) to the single-panel view of one-panel layout 714. In an embodiment, a single-panel view presents content, from one panel in a multi-panel view, in a one-panel layout that encompasses the entire page and cannot concurrently display content associated with multiple client applications 108. For example, one-panel panel layout displays content B from the rightmost panel of two-panel layouts 706 or 710 and omits content A. Similarly, upon detecting selection of either toggle GUI elements 722B or 722D, display component 106 re-renders the layout of the page from a multi-panel view to a single-panel view, for example, to one-panel layout 716 showing content C.

In an embodiment, selecting toggle GUI element 722 to enter a single-panel view forces display component 106 to limit the set of layout to a fixed, one-panel layout that displays content retrieved or generated by one application at any point in time. In an embodiment, when displaying content in a single-panel view as shown in layout group 720, regardless of the attributes of the operating display device, client, selected portion of content as described with respect to FIG. 4, one more types of application generating contents A-C, display component 106 continues to present related content in a single-panel view until the user toggles back to a multi-panel view.

Figure 5:
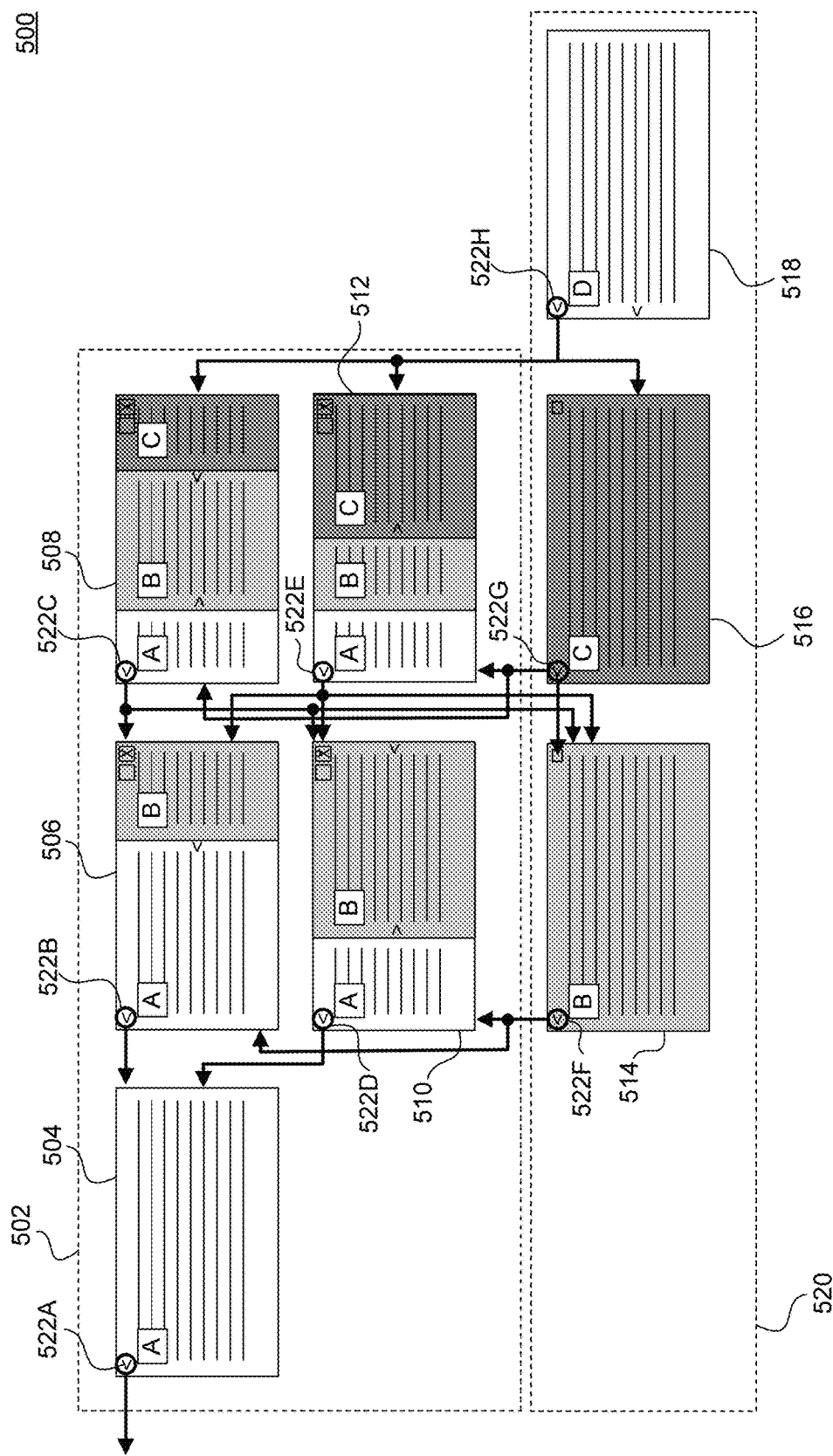
FIG. 5 is a diagram illustrating backwards navigation in a page having a flexible-page layout, according to an example embodiment.

FIG. 5 is a diagram 500 illustrating backward navigation in a page having a flexible-page layout, according to an example embodiment. In an embodiment, the layouts in layout group 502, permitting multi-panel view, and layout group 520, permitting single-panel view, correspond to layout groups 402 and 420 from FIG. 4, respectively. Each of the layouts in layout groups 502 and 520 include respective back GUI elements 522A-H. In an embodiment, the backward navigation sequences shown in diagram 500 correspond to the forward navigation sequence of FIG. 4 and the toggling of FIG. 7.

In an embodiment, display component 106 implements back GUI elements 522A-H to mirror page-based navigation characteristics of browsers. But, in contrast to current browser functionality that depends on page navigation, display component 106 provides backward navigation of flexible-page layouts, including multi-panel and single-panel views of page layouts. As described above, one advantage of implementing a page having a flexible-page layout is to concurrently display related contents without unnecessarily opening and closing separate pages to view each piece of related content.

In an embodiment, as the user navigates from a displayed layout of the page to subsequent layouts, described with respect to FIGS. 4 and 7, display component 106 stores the navigation sequence from the displayed layout through each of the subsequent layouts. In an embodiment, the layouts stored in the navigation sequence can include layouts displayed in a multi-panel view that are subsequently toggled to display a single-panel view. In an embodiment, the layouts stored in the navigation sequence exclude layouts in a single-panel view that are subsequently toggled to display a multi-panel view. In another embodiment, layouts toggled from multi-panel view to single-panel view and vice versa can be stored in the navigation sequence.

In an embodiment, when display component 106 receives a user's selection of a back GUI element, e.g., back GUI element 522, display component 106 provides sequential backward navigation through the previously-displayed layouts as stored in the navigation sequence. For example, when the navigation sequence is stored in a stack data structure, display component 106 'pops' off the most-recently navigated layout in the stack data structure for rendering. In an embodiment, the navigation sequence may be stored as a queue-like data structure where a pointer is adjusted to indicate which layout is the most-recently navigated layout. In an embodiment, as described with respect to FIG. 4, the previously-displayed layouts are each associated with unique corresponding URLs. In such an embodiment, the previously-displayed layouts may be stored as an ordered sequence of URLs in the navigation sequence. Further, each of these layouts in the navigation sequence may be saved as a bookmark in the client, e.g., a browser, using the corresponding URLs.

As shown in diagram 500, upon receiving a user's selection of back GUI element 522H in one-panel layout 518, display component 106 determines the most-recently navigated layout, which may be any one of three-panel layouts 508 or 512, or one-panel layout 516, depending on the user's previous selection that resulted in the generated and displayed one-panel layout 516. In an embodiment, display component 106 determines the most-recently navigated layout using the stored navigation sequence. As described above, in an embodiment, the stored navigation sequence excludes one-panel layouts that are toggled to a multi-panel view.

In another example, upon receiving a user's selection of back GUI element 522G in one-panel layout 516, display component 106 determines the most-recently navigated layout, which may be any one of three-panel layouts 508 or 512, or one-panel layout 514. For example, when the user's previous selection is toggling from the multi-panel view of three-panel layout 512 to the single-panel view of one-panel layout 516, as described with respect to FIG. 7 above, display component 106 determines the most-recently-navigated layout is the page having three-panel layout 512. This example is part of an embodiment where the navigation sequence includes layouts, e.g., three-panel layout 512, that are subsequently toggled to a single-panel view, e.g., one-panel layout 516.

In another example, upon receiving a user's selection of back GUI element 522E in three-panel layout 512, display component 106 determines the most-recently navigated layout, which may be any one of two-panel layouts 506 or 510, or, in an embodiment, one-panel layout 514. For example, in the embodiment where the stored navigation sequence excludes layouts that are toggled from a single-panel view to a multi-panel view, navigating from one-panel layout 514 to 516 then toggling from the single-panel view of one-panel layout 516 to the multi-panel view of three-panel layout 512 may be stored as a navigation sequence from one-panel layout 514 to three-panel layout 512. Thus, the most-recently navigated layout as stored in the navigation sequence is one-panel layout 514 and not one-panel layout 516.

In an embodiment, the user may have navigated layouts in the following order: 504, 510, 514, and 516. In this embodiment, responsive to the user's continuous selection of back GUI elements 522D, F, and G, display component 106 sequentially selects the following layouts for displaying: 514, 510, and 504.

Figure 6:
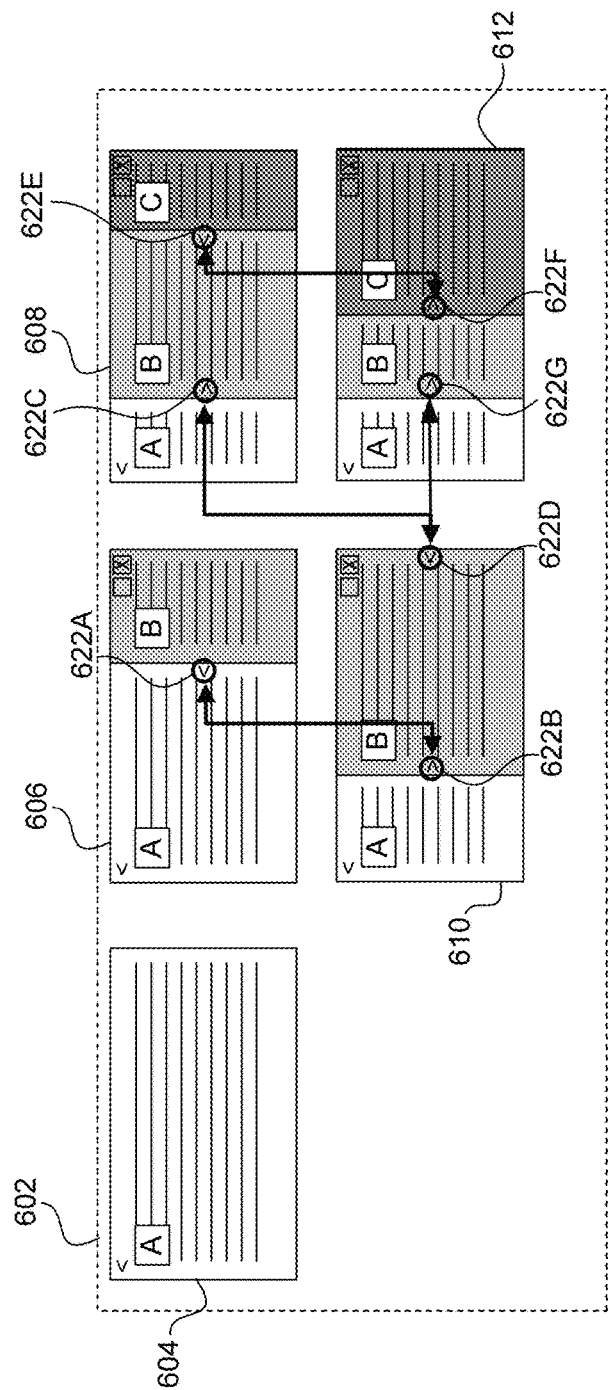
FIG. 6 is a diagram illustrating how to prioritize content within a page having a flexible-page layout by switching between possible layouts of the page, according to an example embodiment.

FIG. 6 is a diagram 600 illustrating how to prioritize content within a page having a flexible-page layout by switching between possible layouts of the page, according to an example embodiment. In an embodiment, layouts 604-612 in layout group 602 correspond to layouts 404-412, respectively, in layout group 402 from FIG. 4. In an embodiment, the page implements layouts in a multi-panel view where one piece of content from related pieces contents has the highest priority for the user's focus. For example, in the multi-panel view of two-panel layout 610, the right panel has the largest width for prioritizing display of content B, which relates to content A. In contrast, in two-panel layout 606, the left panel has the largest width for prioritizing display of content A, which relates to content B. As shown, each multi-panel layout concurrently displays content retrieved or generated by multiple client applications, such as client applications 108 of FIG. 1. These multi-panel layouts may include, for example, two-panel layouts 606 and 610, and three-panel layouts 608 and 612.

In an embodiment, display component 106 implements panel-width adjustment GUI elements 622A-G, which correspond to panel-width adjustment GUI elements 210 of FIG. 2, to adjust priorities of related pieces of content concurrently displayed in a multi-panel view of the flexible-page layout. In an embodiment, whether a specific panel within a multi-panel layout has zero, one, or two panel-width adjustment GUI elements 210 depends on the type of multi-panel layout as well as the other possible multi-panel layouts associated with the page, display device operating the page, or both. In an embodiment, each layout having a multi-panel view prioritizes content within one of the panels. This means the panel displaying prioritized content has the greatest width when compared to each of the other panels in the layout. In an embodiment, to increase the priority of content-of-interest, display component 106 selects one of layouts, within layout group 602, having a greatest-width panel displaying the content-of-interest. In an embodiment, display component 106 implements panel-width adjustment GUI elements 210 between two adjacent panels within the multi-panel layouts.

In an embodiment, display component 106 detects whether one of panel-width adjustment GUI element 622A-G has been selected. Responsive to the detected selection, display component 106 prioritizes content from one of the panels in the layout depending on an indication depicted in panel-width adjustment GUI element 622. In an embodiment, the left panel of two-panel layout 606 includes panel-width adjustment GUI element 622A which indicates, e.g., based on a graphical directionality and location of the element within a panel, an option to prioritize content B shown in the right panel over content A shown in the left panel. To prioritize content B, display component 106 selects two-panel layout 610, which expands the width of the right panel displaying content B and reduces the width of the left panel displaying content A, to display. As shown in two-panel layout 610, selection of panel-width adjustment GUI element 622B causes display component 106 to re-prioritize content A over content B by switching from two-panel layout 610 to two-panel layout 606.

In an embodiment, three-panel layout 608 includes panel-width adjustment GUI elements 622C and 622E within the middle panel. As shown, three-panel layout 608 prioritizes content B shown in the middle panel because the middle panel has a greater width than that of each of the leftmost and rightmost panels. Selecting panel-width adjustment GUI element 622E causes display component 106 to prioritize content C by selecting three-panel layout 612 having the largest width for the rightmost panel displaying content C.

In an embodiment, display component 106 presents panel-width adjustment GUI elements 622A-G to increase the priority of one of the panels displaying content. For example, three-panel layout 608 already prioritizes content B. But, three-panel layout 608 may also enable content B to have increased priority via panel-width adjustment GUI element 622C to render two-panel layout 610. In an embodiment, when display component 106 detects that panel-width adjustment GUI element 622C has been selected, display component 106 selects two-panel layout 610 that further increases the width of the panel displaying content B. As shown, the rightmost panel may be omitted and three-panel layout 608 is minimized to two-panel layout 610. Similarly, selecting panel-width adjustment GUI element 622D causes display component 106 to reduce a priority of content B by selecting three-panel layouts 608 or 612 for displaying content A, B, and C. Selecting panel-width adjustment GUI elements 622C and 622G in three-panel layouts 608 and 612, respectively, causes display component 106 to re-toggle to two-panel layout 610. As described with respect to FIG. 4, whether three-panel layout 608 or 612 is selected may depend on, for example, the type of content of B or C, the applications retrieving the content, among other factors. In an embodiment, two-panel layout 610 includes panel-width adjustment GUI element 622D only if content C was previously displayed in a third panel, for example, in one of three-panel layouts 608 and 612.

FIG. 10 is a diagram 1000 illustrating how splitter indication icon 1010, within layouts 1002-1008, permits panel-width adjustment within a page having a flexible-page layout, according to an example embodiment. In an embodiment, a display component, such as display component 106 of FIG. 1, implements splitter indication icon 1010, which corresponds to splitter indication icon 234 of FIG. 2, to adjust priorities of related pieces of content concurrently displayed in a multi-panel view of the flexible-page layout. Particularly, like panel-width adjustment GUI elements 622 described with respect to FIG. 6, splitter indication icon 1010 permits prioritization of specific content by adjusting the width of a panel displaying that content. Unlike panel-width adjustment GUI elements 622, however, splitter indication icon 1010 provides a more flexible mechanism, as described below.

In an embodiment, like splitter indication icon 234 of FIG. 2, splitter indication icon 1010 permits either a fixed or a variable width adjustment of adjacent panels. The type of permitted width adjustment depends on one or more of the following factors: the type of page, the application generating content in the page, or the set of layouts associated with the page.

In an embodiment, the progression from layout 1002 to layout 1006 depicts splitter indication icon 1010 that permits a fixed width adjustment. As shown and indicated by the dotted line, layout 1004 may be a transition state between layouts 1004 and 1006, and not one of the layouts from the set of layouts associated with the page. Therefore, the width adjustment is fixed because the selected layout for displaying content is selected from the set of layouts associated with the page. As described with respect to FIG. 2, the display component may display splitter indication icon 1010A in two-panel layout 1002 upon detecting that the user is, e.g., hovering a pointer (e.g., mouse arrow) over, or selects (e.g., by touch or a mouse click), the splitter indication line separating the adjacent panels displaying contents A and B. Splitter indication icon 1010A includes a directionality element, in this case, a right arrow, to indicate in which direction(s) the panel widths can be adjusted.

In an embodiment, for splitter indication icon 1010 that permits a fixed width adjustment, as soon as the user releases splitter indication icon 1010, the display component selects a layout, from the set of layouts associated with the page, having the corresponding splitter line indication in a location closest to the location of the released splitter indication icon 1010. For example, the page may be associated with two-panel layouts 1002 and 1006. If the user releases splitter indication icon 1010B, as shown in the transition state of layout 1004, at a location at or above 50% (or a corresponding pixel value) of the page's width, the display component selects layout 1006 as the subsequent layout to concurrently display contents A and B. Likewise, should the user release splitter indication icon 1010B between 0%-50% (or corresponding pixel values) of the page's width, the display component may maintain layout 1002. Though specific percentages may be depicted and discussed, other percentage values may be implemented.

In an embodiment, the progression from layout 1002 to layout 1008 depicts splitter indication icon 1010 that permits a variable width adjustment. In an embodiment, splitter indication icon 1010 permits widths of adjacent panels to be adjusted in two or more options as opposed to the fixed-adjustment scenario where either the panel widths are adjusted to layout 1006 as shown or remain as layout 1002. In an embodiment, splitter indication icon 1010 permits the corresponding splitter line indication to be set at any location between two locations to adjust the widths of adjacent panels. For example, as shown in layout 1008, splitter indication icon 1010D is draggable between 33% and 67% of the page's width. In contrast to the fixed width adjustment, a corresponding splitter line indication is maintained at the location of the released splitter indication icon 1010D and does not "snap" into a designated location of a layout in the set of layouts associated with the page.

Figure 11:
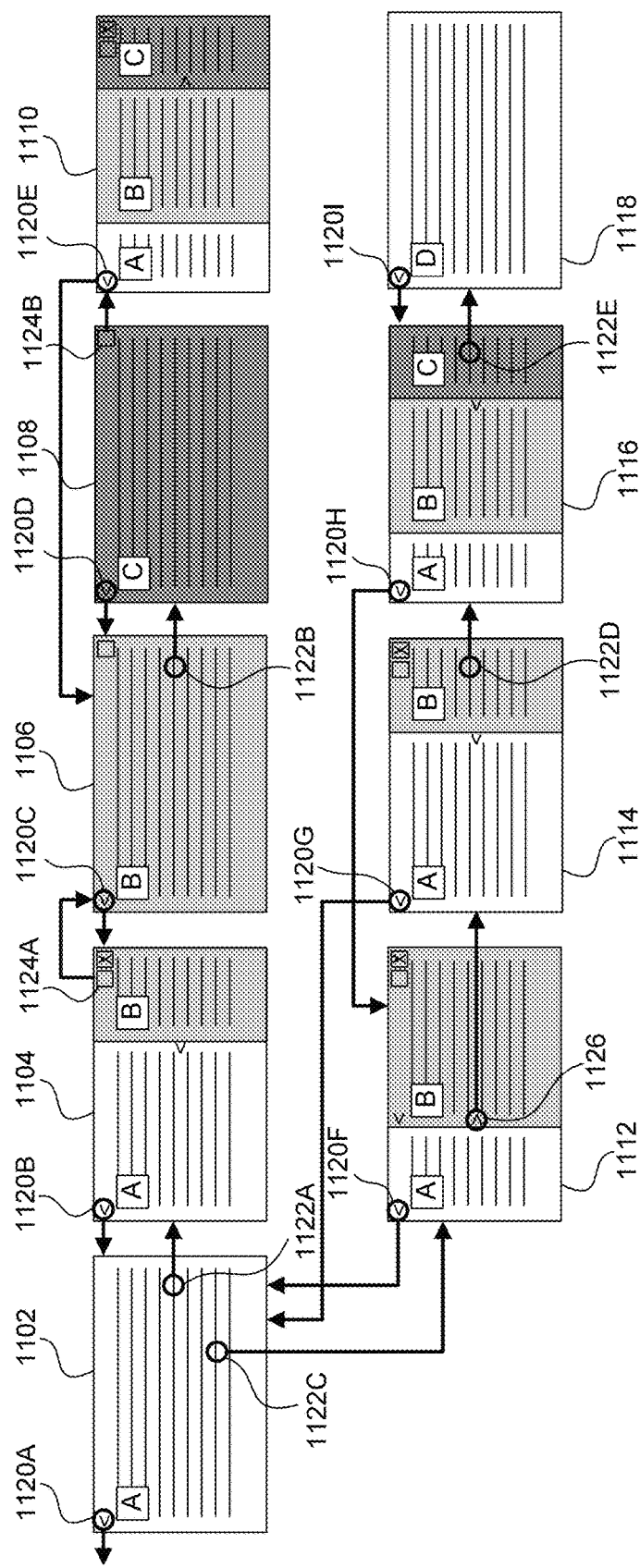
FIG. 11 is a diagram illustrating two example navigation sequences for a page having a flexible-page layout and corresponding backward navigation behavior, according to an example embodiment.

FIG. 11 is a diagram 1100 illustrating two example navigation sequences for a page having a flexible-page layout and corresponding backward navigation behavior, according to an example embodiment. As shown, the navigation sequences includes the forward navigation, prioritization, and toggling as described above with respect to FIGS. 4, 6, and 7, respectively. The corresponding backward navigation behavior is also depicted, further described with respect to FIG. 5. In an embodiment, a display component, such as display component 106 of FIG. 1, within a display device implementing the flexible-page layout controls the navigation behavior.

An example navigation sequence starts by displaying a page having one-panel layout 1102. As described with respect to FIG. 5, upon receiving a user's selection of portion 1122A of content A, the display component generates content B that relates to the selected portion 1122A. Then, the display component selects two-panel layout 1104 having a larger left panel for concurrently displaying contents A and B. As described with respect to FIG. 7, upon receiving a user's selection of toggle GUI element 1124A, the display component toggles from a multi-panel view of two-panel layout 1104 to a single-panel view to display content B in one-panel layout 1106. Subsequently, the display component may receive a selection of portion 1122B and receive content C related to the selected portion 1122B. Content C is presented in a single-panel view of one-panel layout 1108. Upon receiving a user's reselection of toggle GUI element 1124B, the display component toggles from a single-panel view of content C in one-panel layout 1108 to a multi-panel view of related contents A-C in three-panel layout 1110. In an embodiment, the display component implements back GUI element 1120A-E that upon a user's continuous selection, re-displays the immediate previously-navigated layout stored in the navigation sequence as described with respect to FIG. 5.

In an embodiment, as described with respect to FIG. 5, the navigation sequence includes layouts that are toggled from a multi-panel view to a single-panel view but excludes layouts that are toggled from a single-panel view to a multi-panel. As a result, selection of back GUI element 1120E causes the display component to select one-panel layout 1106, which is the immediate previously-navigated layout stored in the navigation sequence. This is because one-panel layout 1108 is not stored in the navigation sequence since this layout toggles from a single-panel view to a multi-panel view of three-panel layout 1110. In contrast, selection of back GUI element 1120C causes the display component to select two-panel layout 1104 because layouts that toggle from a multi-panel view, e.g., two-panel layout 1104, to a single-panel view, e.g., one-panel layout 1106, are stored in the navigation sequence. In an embodiment, all navigated layouts are stored in the navigation sequence in which case selection of back GUI element 1120E would cause the display component to select one-panel layout 1108.

Diagram 1100 shows another example navigation sequence starting at the displayed page having one-panel layout 1102. As described with respect to FIG. 5, upon receiving a user's selection of portion 1122C of content A, the display component generates content B that relates to the selected portion 1122C. Then, the display component selects two-panel layout 1112 having a larger right panel for concurrently displaying contents A and B. In an embodiment, which type of layouts selected, for example, either two-panel layout 1104 or 1112, depends on the selected portions 1122A or C of content A, respectively. In an embodiment, the type of layouts selected is associated with the page and independent of the selected portions 1122 of content. In this case, the same layout will be selected whenever the display component receives selected portions 1122A or C.

As described with respect to FIG. 6, upon receiving a user's selection of panel-width adjustment GUI element 1126, the display component selects two-panel layout 1114 having a larger left panel to prioritize view of content A. Subsequently, the display component may receive a selection of portion 1122D and receive content C related to the selected portion 1122D. Content C is presented in a right-most panel of three-panel layout 1116. Upon receiving a user's selection of portion 1122E of content C, the display component displays related content D in a single-panel view of one-panel layout 1118. This may occur if the page is associated with layouts having, for example, at most three panels for concurrently displaying related content. In an embodiment, the display component implements back GUI element 1120A and F-I that upon a user's continuous selection, re-displays the immediate previously-navigated layout stored in a navigation sequence as described with respect to FIG. 5.

In an embodiment, the navigation sequence excludes layouts that are displayed based on a selection to prioritize certain content in the layouts. For example, two-panel layout 1114 may be generated based on selection of panel-width adjustment GUI element 1126 and therefore, in an embodiment, will not be stored in the navigation sequence. In this example, selection of back GUI element 1120H causes the display component to select two-panel layout 1112 and not two-panel layout 1114. In an embodiment, selection of either back GUI elements 1120F-G causes the display component to select one-panel layout 1102 for displaying content A.

Figure 12:
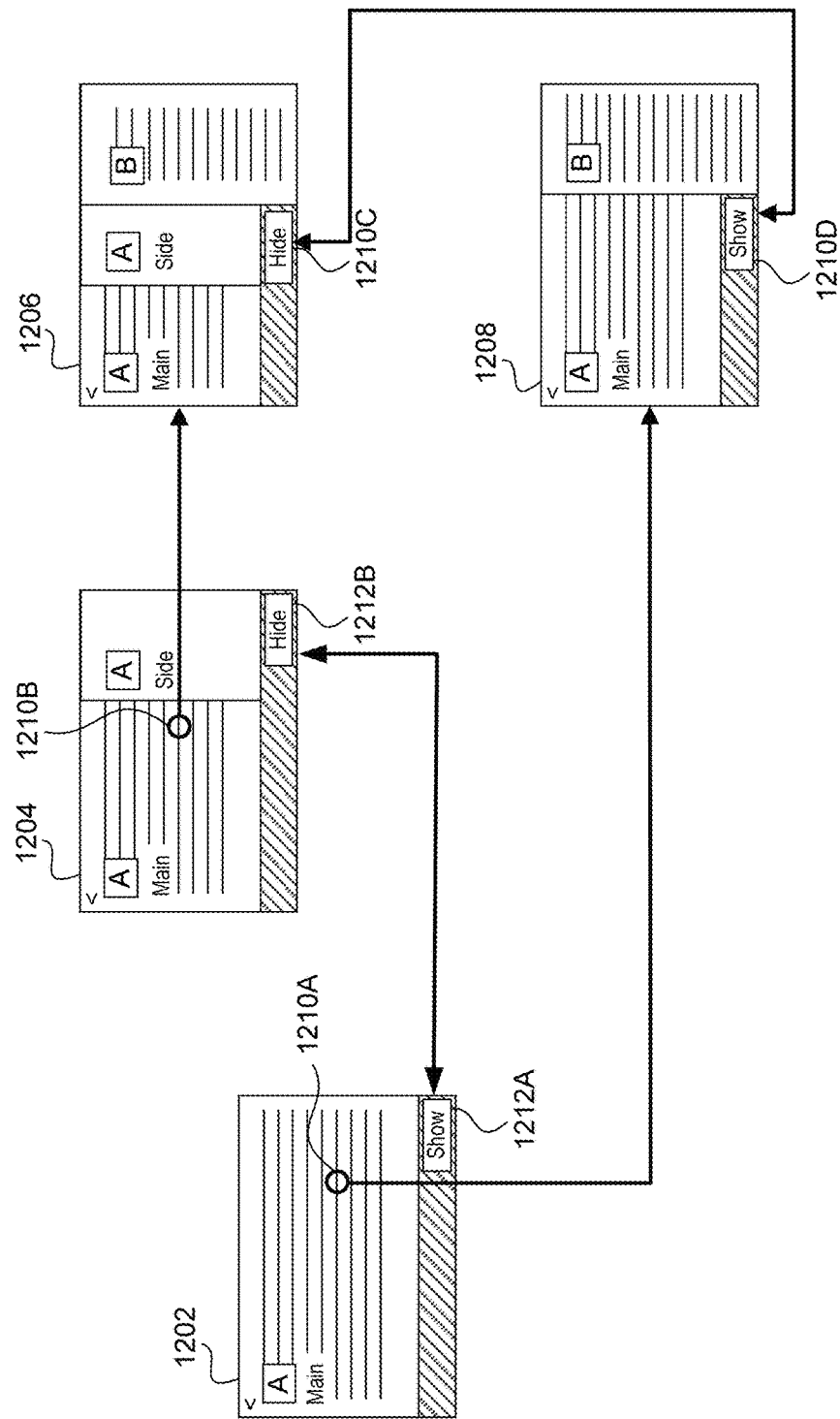
FIG. 12 is a diagram illustrating how to implement display of side content within a page having a flexible-page layout, according to an example embodiment.

FIG. 12 is a diagram 1200 illustrating how a display component, such as display component 106 of FIG. 1, implements display of side content within a page having a flexible-page layout, according to an example embodiment. In an embodiment, content received by the display component includes main content and side content. Main content is content that should be displayed in a panel of a displayed layout whereas side content is content related to a main content panel that may be optionally hidden from display to provide more display area for the main content. In an embodiment, portions of received content may be tagged as either main content or side content. In an embodiment, related side content may be defaulted as hidden (hide). In an embodiment, related side content may be defaulted as displayed (shown).

In an embodiment, as shown in one-panel layout 1202, the display component receives content A and displays main content A whereas side content A is hidden from view. In an embodiment, upon receiving a user's selection of toggle side content GUI element 1212A, "Show," the display component generates one-panel layout 1204 concurrently displaying main content A and side content A. Conversely in this embodiment, upon receiving the user's selection of toggle side content GUI element 1210B, "Hide," display component 106 re-renders one-panel layout 1202 displaying main content A. Though side content A is shown in FIG. 12 to be in a right sub-panel of the panel displaying main content A, side content A may be displayed in a left sub-panel instead.

In an embodiment, the display component divides the panel displaying content A into two sections where a larger section displays the main content and the smaller section displays the side content. For example, one-panel layout 1204 shows a larger sub-panel, an example section, for displaying main content A. In an embodiment, the sub-panel displaying side content, such as side content A, occupies a specific proportion of the page's width depending on the screen size of the display device operating the page. For example, a display device displaying one-panel layout 1204 may have a screen width of 1440 pixels, which allows the display component to generate a sub-panel occupying 25% of the page's width, i.e., 360 pixels to display the side content. In an embodiment, reselecting toggle side content GUI element 1210B, "Hide," will cause the display component to re-display one-panel layout 1202.

In an embodiment, should the width of the side content fall below a certain width, e.g., 320 pixels, the display component changes how the side content is displayed. For example, the display component may generate the section displaying the side content as a horizontal section beneath the main content. In an embodiment, the display component may automatically omit the side content from being displayed, as shown in one-panel layout 1202. In this embodiment, upon receiving the user's selection of toggle side content GUI element 1212A, "Show," the display component displays side content A adjacent to the main content A as shown in one-panel layout 1204 with the side content A.

In an embodiment, upon receiving a user's selection of portion 1210A of main content A, the display component generates two-panel layout 1208 concurrently displaying main content A and content B, which relates to portion 1210A. Like toggle side content GUI element 1212A in one-panel layout 1202, two-panel layout 1208 implements toggle side content GUI element 1210D within the panel displaying main content A. In an embodiment, display component 106 selects two-panel layout 1206 showing main content A, side content A, and main content B upon receiving a user's selection of portion 1210D of main content A in two-panel layout 1208. In an embodiment, a flexible-screen layout containing three panels may not permit display of side content.

In an embodiment, the display component displays the side content A alongside main content A, as shown in two-panel layout 1206, upon receiving a user's selection of toggle side content GUI element 1210D. Conversely in this embodiment upon receiving the user's selection of toggle side content GUI element 1210C, "Hide," display component 106 re-renders two-panel layout 1208.

Figure 8:
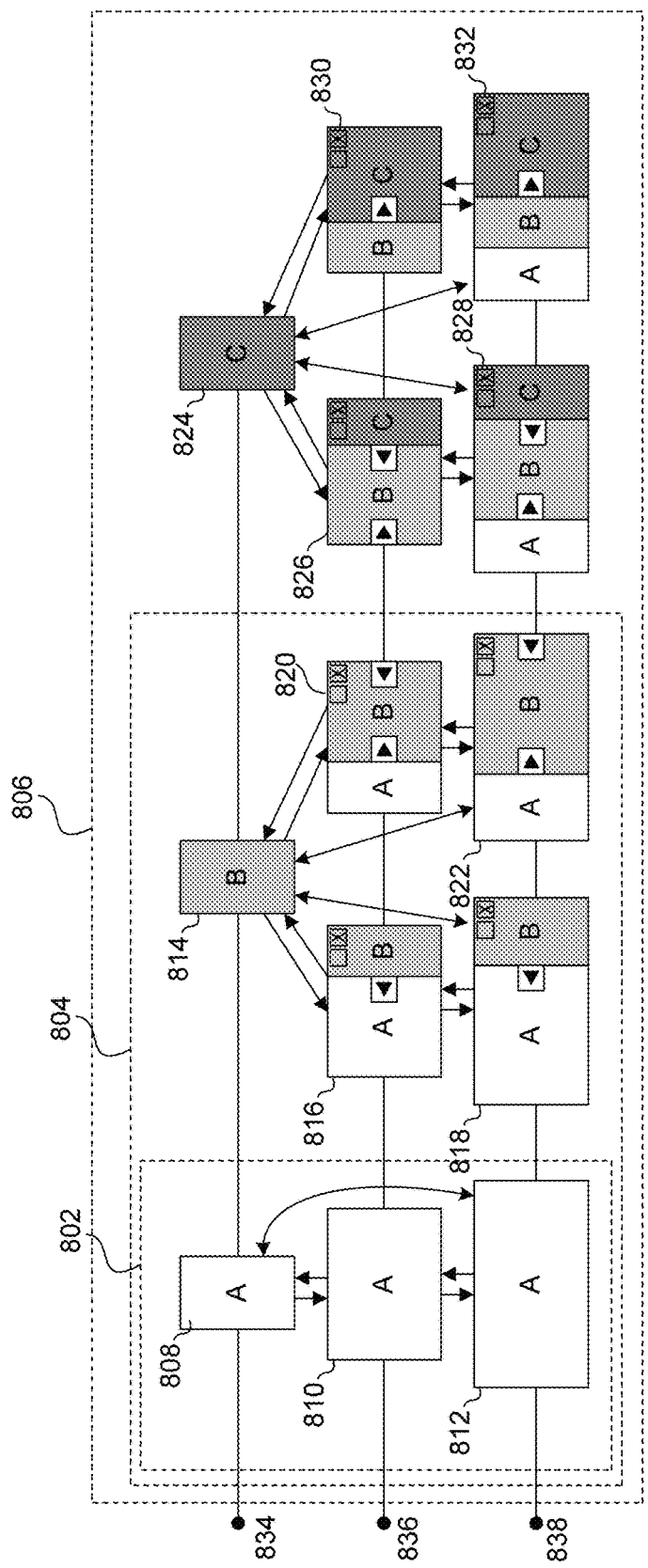
FIG. 8 is a diagram illustrating how a page having a flexible-page layout is runtime responsive based on a display device, according to an example embodiment.

FIG. 8 is a diagram 800 illustrating how a flexible-page layout is runtime responsive based on a display device, according to an example embodiment. In an embodiment, navigation sequences 834-838 show how display component 106 implements forward navigation of content on a first, second, and third display device, respectively. More forward navigation details are described above with respect to FIG. 4.

In an embodiment, navigation sequence 834 shows how display component 106 presents content A, B, and C on the first display device. As shown, the first display device, such as a smartphone, may have a small width. In an embodiment, the first display device represents a second or a third display device in a portrait orientation, which results in a small width. Therefore, display component 106 may restrict the flexible-page layout to a single-panel view such that a user operating the first display device is required to navigate content A, B, and C page by page. Display component 106 presents content A, B, and C within one-panel layouts 808, 814, and 824, respectively.

In an embodiment, navigation sequence 836 shows how display component 106 presents content A, B, and C on the second display device. As shown, the second display device, such as a tablet, may have a width large enough to support a maximum of two panels in a layout. Therefore, display component 106 may restrict the set of possible layouts usable by a page to a one-panel or a two-panel layout. Display component 106 may present content A on one-panel layout 810. When display component 106 is required to present two or more contents, for example, two of content A, B, and C, display component 106 may present the two or more contents within one of two-panel layouts 816, 820, 826, and 830 such that two of content A, B, and C are concurrently presented alongside each other.

Navigation sequence 836 also shows how content within a panel in a two-panel layout can be prioritized using panel width adjustment GUI elements, as described with respect to FIG. 6. Particularly, in an embodiment, one panel within a two-panel layout always has a greater width than the other panel to prioritize the content displayed in that one panel. In an embodiment, each of the panels may include zero, one, or two panel width adjustment GUI elements depending on the location of the panel within the layout, the permitted types of layouts, the specific requirements of the page, requirements or implementation of the application generating the page, or a combination thereof.

In an embodiment, navigation sequence 838 shows how display component 106 presents content A, B, and C on the third display device. As shown, the third display device, such as a desktop or laptop computer, may have a width large enough to support a maximum of three panels in a layout. Therefore, display component 106 may restrict the set of possible layouts usable by a page to a one-panel, a two-panel layout, or a three-panel layout. Display component 106 may present content A on one-panel layout 812. When display component 106 is required to present content A and B, display component 106 may present the content A and B within one of two-panel layouts 818 and 822 such that both content A and B are concurrently presented alongside each other. When display component 106 is required to present content A, B, and C, display component 106 may present content A, B, and C within one of three-panel layouts 828 and 832 such that all three content A, B, and C are concurrently presented alongside each other.

Navigation sequence 838 also shows how content within a panel in a two-panel layout or three-panel layout can be prioritized using panel width adjustment GUI elements, as described with respect to FIG. 6. Particularly, in an embodiment, one panel within a multi-panel layout always has a greater width than the other panels to prioritize the content displayed in that one panel.

In an embodiment, display component 106 adapts how content is to be displayed within a page having a flexible-page layout based on one or more detected attributes of the display device, as described with respect to FIG. 3. For example, a detected attribute may be a type of the display device. In a single-panel view 802, diagram 800 shows that the one-panel layouts 808-812 are maintained regardless of the types of the first, second, and third display devices, i.e., the display devices corresponding to navigation sequences 834, 836, and 838, respectively. Therefore, display component 106 may force a user to navigate content page by page regardless of the attributes of the operating device.

In an embodiment, in a multi-panel view 804 where at most two panels are permitted within a displayed layout, diagram 800 shows that based on the device type, display component 106 enables a user to navigate content in a hierarchical manner such that up to two interrelated content may be concurrently presented in the page using one of the two-panel layouts 816-822. For example, when a user is accessing content on the third device, i.e., the device corresponding to navigation sequence 838, display component 106 permits the user to view content A and B concurrently on one of two-panel layouts 818 and 822. When the user reverts to a second display device, i.e., the device corresponding to navigation sequence 836, for viewing content, display component 106 adaptively displays content A and B from two-panel layout 818 or 822 within two-panel layouts 816 and 820 of the second display device, respectively.

When the user reverts to the first device, display component 106 may force the user to navigate content A and B page by page since the first device is limited to one-panel layouts 808 and 814.

In an embodiment, in a multi-panel view 806 where at most three panels are permitted within a displayed layout, diagram 800 shows that based on the device type, display component 106 enables a user to navigate content in a hierarchical manner such that up to three interrelated content may be concurrently presented in the page using one of the three-panel layouts 828 and 832. For example, when a user is accessing content on the third device, i.e., a device corresponding to navigation sequence 838, display component 106 permits the user to view content A, B, and C concurrently on one of three-panel layouts 828 and 832. When the user reverts to a second display device for viewing content, display component 106 adaptively displays content A, B, and C from three-panel layouts 828 or 832 within two-panel layouts 826 and 830 of the second display device, respectively. When the user reverts to the first device, display component 106 may force the user to navigate content A, B, and C page by page since the first device is limited to one-panel layouts 808, 814, and 824.

In an embodiment, by changing the maximum number of panels in a layout based on a type of the display device, e.g., whether the display device is a first, second, or third display device, display component 106 maintains a minimum width of a panel for viewing content within that layout. Otherwise, should a three-panel layout, such as three-panel layout 828, or a two-panel layout, such as two-panel layout 826, be maintained on the first device, the absolute width of one or more of the panels will be so thin as to render displayed content unreadable.

Figure 9A:
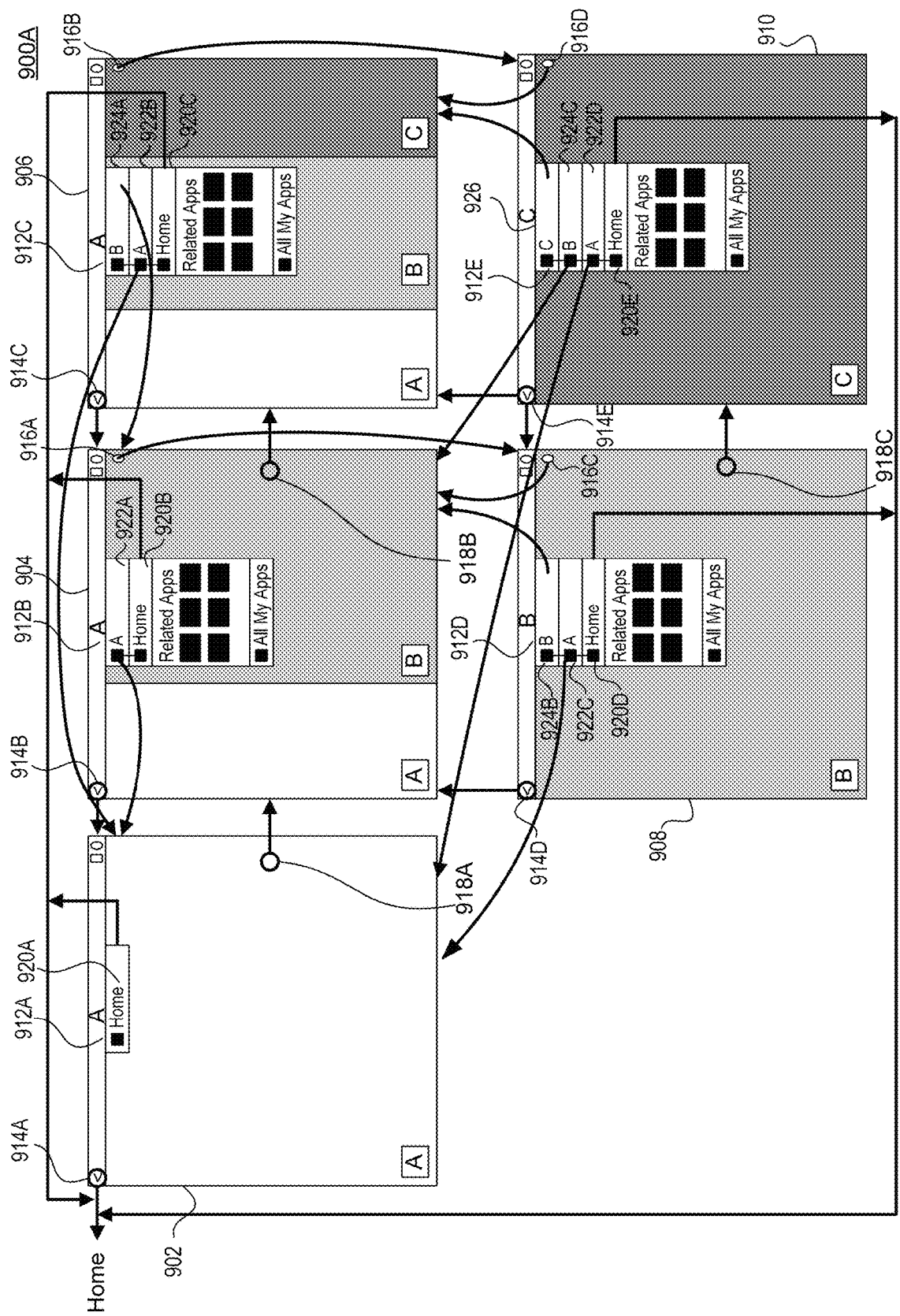
FIGS. 9A-B are diagrams illustrating hierarchical navigation in a page having a flexible-page layout, according to an example embodiment.
Figure 9B:
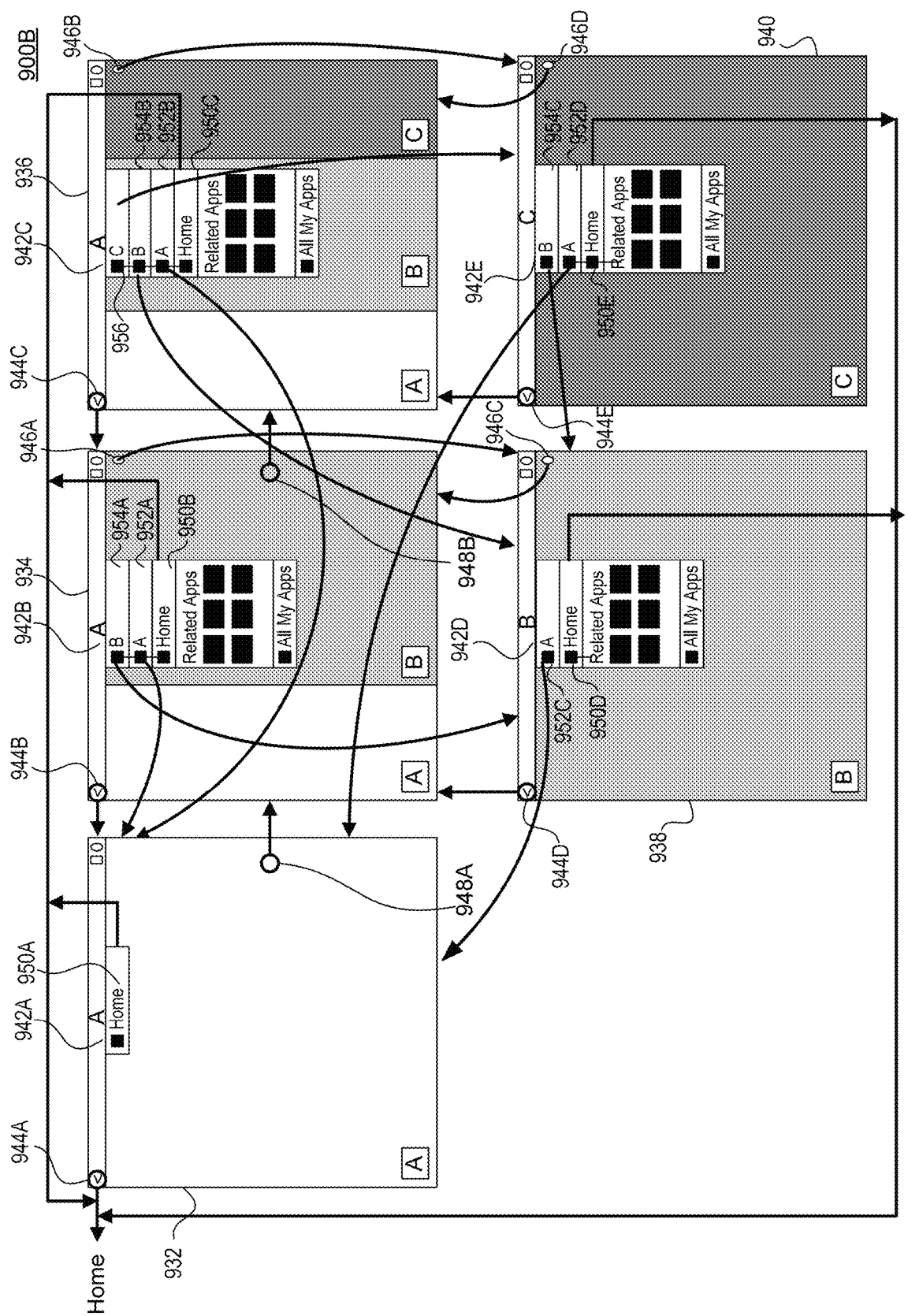

FIGS. 9A-B are diagrams 900A-B illustrating hierarchical navigation in a page having a flexible-page layout, according to an example embodiment. In an embodiment of diagram 900A, a display component, such as display component 106 of FIG. 1, within a display device implements navigation menu 912 within each of layouts 902-910 to permit a user to navigate to any previously-navigated layout and associated page. In the embodiment of FIG. 9A, selectable entries in navigation menu 912 represents previously-navigated layouts and their view type, e.g., either multi-panel or single-panel view.

As shown in diagram 900A, the display component also implements back GUI element 914 within each of layouts 902-910 to permit the user to navigate to an immediate previously-navigated layout without first accessing navigation menu 912. In an embodiment, the permitted functionality and GUI of navigation menu 912 corresponds to that of navigation menu 220, as described with respect to FIG. 2. Like navigation menu 220, navigation menu 912 may display a navigation history region, relevant applications region, or an all my applications region.

In an embodiment, upon selecting application A from a "Home" page, the display component requests the selected application A to retrieve or generate content A for display. Responsive to receiving content A, the display component displays content A in one-panel layout. In an embodiment, navigation menu 912 displays the user's historic navigation sequence in a vertical hierarchical arrangement where each level in the arrangement represents a previously-navigated layout and associated page. As discussed with respect to FIG. 2, other orientation (e.g., horizontal) or arrangements are possible. As shown, navigation menu 912A displays entry 920A as the only level in the user's current historical navigation sequence. Entry 920A represents the "Home" page and its associated layout. When the display component detects a user's selection of entry 920A-E in any of layouts 902-910, respectively, the display component returns to the "Home" page that was previously displayed.

As soon as the user navigates from one-panel layout 902 to two-panel layout 904, e.g., via selection of portion 918A of content A, navigation menu 912B displays the user's navigation sequence in a vertical hierarchical arrangement with two levels: the upper level including entry 922A, "A," and the lower level including entry 920B, "Home." Like navigation menu 912A, each level represents a previously-navigated and displayed layout. In this embodiment, a higher level in the vertical hierarchical arrangement of navigation menu 912 indicates that the layout represented by the higher was more recently displayed. In other embodiments, a lower level represents a more recently displayed and navigated layout.

Similarly, when the user navigates from two-panel layout 904 to three-panel layout 906, e.g., via selection of portion 918B of content B, navigation menu 912C adds entry 924A, "B," as the highest level in the depicted vertical hierarchical arrangement. In an embodiment, upon receiving a user's selection of one of entries 924A, 922B, or 920C, the display component displays the previously-navigated layout associated with the selected entry. Therefore, navigation menu 912, such as navigation menu 912C, permits out-of-order backward navigation as opposed to the sequential backward navigation functionality provided by back GUI element 914.

In an embodiment, as described with respect to FIG. 7, the display component implements toggle GUI element 916 to allow the user to maximize display of a specific piece of content within the page. In particular, toggle GUI element 916 permits the user to toggle between a multi-panel view and a single-panel view within the page having a flexible-page layout. For example, upon receiving a user's selection of toggle GUI element 916A in the multi-panel view of two-panel layout 904, the display component subsequently selects one-panel layout 908 that encompasses content B in a single-panel view, thus maximizing display of content B in the page. Here, the display component adds entry 924B, "B," as the highest level within the vertical hierarchical arrangement of navigation menu 912D. Entry 924B represents two-panel layout 904 that concurrently displays related pieces of content A and B. Similarly, the display component displays one-panel layout 910 upon receiving the user's selection of toggle GUI element 916B. In this case, the display component adds entry 926, "C," which represents three-panel layout 906 concurrently displaying related pieces of content A-C.

In an embodiment, the display component navigates from one-panel layout 908 to one-panel layout 910 based on detecting a user's selection of selectable portion 918C of content B. In this embodiment, the display component selects one-panel layout 908 for display upon detecting a selection of back GUI element 914E. Also in this embodiment, navigation menu 926 would omit entry 912E and selecting entry 924C, "B," causes the display component to select one-panel layout 908 for display because one-panel layout 908 was the previously navigated layout.

FIG. 9B is a diagram 900B illustrating hierarchical navigation in a page having a flexible-page layout, according to an example embodiment. In the embodiment of diagram 900B, a display component, such as display component 106 of FIG. 1, within a display device implements navigation menu 942 within each of layouts 932-940 to permit a user to navigate to a single-panel view of any navigated layout and associated page. In an embodiment, if the currently displayed layout is in a single-panel view, navigation menu 942 omits the entry representing the currently displayed layout. In the embodiment of FIG. 9B, selectable entries in navigation menu 942 represents navigated layouts as permitted and stored in a navigation sequence as described with respect to FIGS. 5 and 11.

Much like the embodiment of FIG. 9A, selecting application A from a "Home" page causes the display component to request the selected application A to retrieve or generate content A for display. Responsive to receiving content A, the display component displays content A in one-panel layout 932. Similar to navigation menu 912 described with respect to FIG. 9A, navigation menu 942 displays the user's historic navigation sequence in a vertical hierarchical arrangement.

In an embodiment, each level of navigation menu 912 in the arrangement represents a single-panel view of one or more previously-navigated layouts and associated pages. In an embodiment, navigation menu 912 stores unique single-panel views and as a result, navigating from, for example, two-panel layout 934 to single-panel layout 938 does not generate a new entry. Similarly, prioritizing content within a panel, e.g., from two-panel layout 934 having a larger right panel to a two-panel layout having a larger left panel, also does not generate a new entry because the single-panel views of these two-panel layouts are the same.

As discussed with respect to FIG. 2, other orientation (e.g., horizontal) or arrangements are possible. As shown, navigation menu 942A displays entry 950A as the only level in the user's current historical navigation sequence. Entry 950A represents the "Home" page and its associated layout. When the display component detects a user's selection of entry 950A-E in any of layouts 932-940, respectively, the display component returns to the "Home" page that was previously displayed.

As soon as the user navigates from one-panel layout 942 to two-panel layout 944, e.g., via selection of portion 948A of content A, navigation menu 942B displays the user's navigation sequence in a vertical hierarchical arrangement with three levels: the upper level including entry 954A, "B," a middle level including entry 952A, "A," and the lower level including entry 950B, "Home." Like navigation menu 942A, each level represents a single-panel view of navigated and displayed layouts. In an embodiment, a higher level in the vertical hierarchical arrangement of navigation menu 942 indicates that the layout represented by the higher was more recently displayed. In other embodiments, a lower level represents a more recently displayed and navigated layout.

Similarly, when the user navigates from two-panel layout 934 to three-panel layout 936, e.g., via selection of portion 948B of content B, navigation menu 942C adds entry 956, "C," as the highest level in the depicted vertical hierarchical arrangement. In an embodiment, upon receiving a user's selection of one of entries 956, 954B, or 952B, the display component displays the corresponding single-panel view, i.e., one of one-panel layouts 940, 938, and 932, associated with the selected entry. Therefore, navigation menu 942, such as navigation menu 942C, permits a user a single-panel view of a navigated layout.

In an embodiment, as described with respect to FIG. 7, the display component implements toggle GUI element 946 to allow the user to maximize display of a specific piece of content within the page. In particular, toggle GUI element 946 permits the user to toggle between a multi-panel view and a single-panel view within the page having a flexible-page layout. For example, upon receiving a user's selection of toggle GUI element 946A in the multi-panel view of two-panel layout 934, the display component subsequently selects one-panel layout 938 that encompasses content B in a single-panel view, thus maximizing display of content B in the page. As described above, selecting entry 954A, "B," would also select one-panel layout 938 for maximizing display of content B in the page. In an embodiment, if the currently displayed layout is in a single-panel view, navigation menu 942 omits the entry representing the currently displayed layout. Therefore, in one-panel layout 938, the display component omits entry 954A, which leaves entry 952C, "A" as the highest level within the vertical hierarchical arrangement of navigation menu 942D. Similarly, navigation menu 942C includes entry 956, "C," which is omitted from navigation menu 942E of one-panel layout 940.

In an embodiment, since entries within navigation menu 942 represent unique single-panel views, the display component selects one of one-panel layouts 932, 938, or 940 based on a corresponding selection of entry 952A-D, 954A-C, or 956.

In an embodiment, layouts 932-940 implement back GUI elements 944A-E. Like back GUI elements 914A-E as described with respect to FIG. 9A, back GUI elements 944A-E allows the user to navigate to a previously-navigated layout as permitted and stored in a navigation sequence. Due to the functionality provided by navigation menu 942, selecting back GUI element 944D may cause the display component to select layouts 934, 936, or 940 because the display component may have navigated to one-panel layout 938 from any of layouts 934, 936, or 940 in response to detecting a selection of one of entries 954A-C in corresponding navigation menus 942B, 942C, and 942E.

Figure 13:
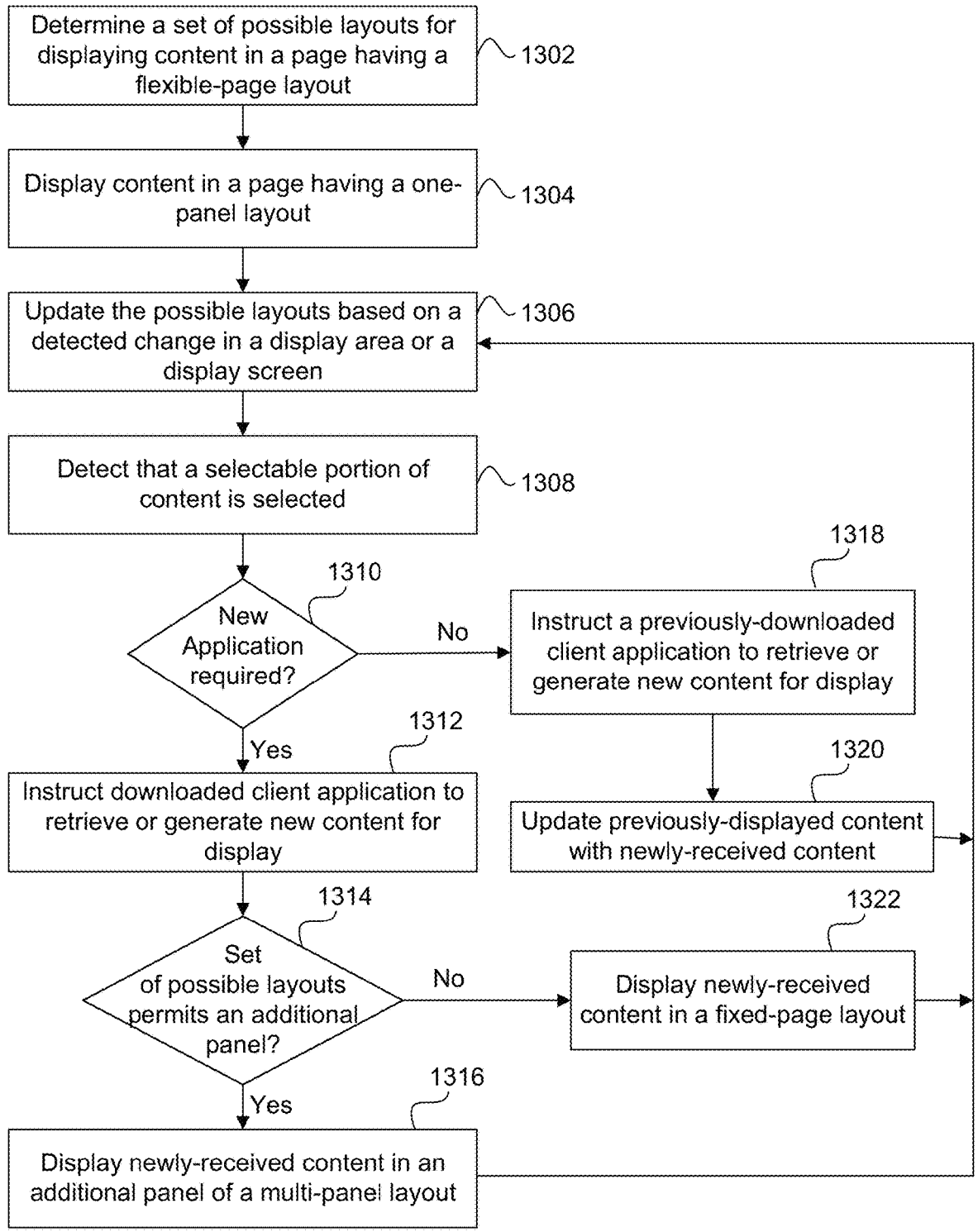
FIG. 13 is a flowchart illustrating a method for forward navigation within a flexible page layout, according to an example embodiment.

FIG. 13 is a flowchart illustrating a method 1300 for forward navigation within a flexible-page layout, according to an example embodiment. Method 1300 can be performed by processing logic that can comprise hardware (e.g., circuitry, dedicated logic, programmable logic, microcode, etc.), software (e.g., instructions executing on a processing device), or a combination thereof. In an embodiment, a client, such as client 104 from FIG. 1, operating on a display device performs the steps of method 1300. In an embodiment, a display component, such as display component 106 of FIG. 1, within the client performs the steps of method 1300.

In step 1302, the client determines a set of possible layouts for displaying content in a page having a flexible-page layout. In an embodiment, the client selects one or more layouts to include in the set of layouts based on one or more attributes of the display device, as described above with respect to FIG. 3. For example, the selected one or more layouts may be selected from the layouts in flexible-page layout mode 402 described in FIG. 4. In an embodiment, the set of possible layouts include at least a one-panel layout. At any given instance in time, the page having the flexible-page layout may be adapted to one of the layouts in the set of possible layouts depending on one or more attributes of the display device, a number of content selections by a user, or a selected option to increase the viewing-priority of certain content within the page. In an embodiment, the determination of step 1302 is triggered when a user accesses one of client applications 108 from a home page. Thus, the flexible-page layout may be associated with the specific accessed client application 108.

In step 1304, the client displays content in the page having a one-panel layout, which is a possible layout of the set of possible layouts.

In step 1306, the client updates the possible layouts in the set of layouts of step 1302 based on a detected change in a display area of the client or a display screen of the display device. For example, the client may detect that the physical orientation of the display device has changed from a landscape mode to a portrait mode. Depending on whether the width of the client's display area meets certain thresholds, the client may remove some multi-panel layouts from the set of possible layouts. In an embodiment, the client detects whether the client's display area has changed. This may occur, for example, if the client allows a user to adjust a width and height of the client. As an example, a user may change the width, height, or both of a browser window. In an embodiment, the client may initiate step 1306 whenever the client detects that the display area or the display screen has changed. Therefore, it may be possible for the client to perform step 1306 before or after any of the steps in method 1300.

In step 1308, the client detects that a selectable portion of the content, in the one-panel layout of step 1304, is selected. In an embodiment and as described with respect to FIG. 4, the selectable portion indicates that the client should instruct a client application to retrieve or generate content for displaying within the page.

In step 1310, the client determines whether the selectable portion requires a new application to retrieve or generate content. In an embodiment, when the selectable portion is in the rightmost panel of a current layout of the page, the client determines that the new application associated with the selectable portion is required. In an embodiment, the new application is not required if the client previously downloaded a client application that corresponds to the selectable portion. In an embodiment, when the new application is required, the client sends a request to a service system, such as service system 112 of FIG. 1, to download a client application that corresponds to the required new application. As described with respect to FIG. 1, the downloaded client application may be associated with a respective componentized application stored within the service system. Then, method 1300 proceeds to step 1312. Otherwise, when no new application is required, method 1300 proceeds to step 1318.

In step 1312, the client instructs the downloaded client application to retrieve or generate new content for displaying within the page of step 1304. Subsequently, the client receives the new content. Since this new content was received in response to detecting a portion (of content) selected from the previously-displayed content in step 1308, this new content is interrelated to the previously-displayed content.

In step 1314, the client determines whether the set of possible layouts permit an additional panel to be introduced to a current layout of the page to present the newly received content from step 1312. If the set of possible layouts includes a multi-panel layout that has an additional panel than a current layout of the page, method 1300 proceeds to step 1316. Otherwise, method 1300 proceeds to step 1322.

Based on the set of possible layouts, step 1314 effectively limits the maximum number of panels concurrently displaying related content. In an embodiment, the client determines a maximum number of panels assigned to the flexible-page layout. This maximum number may depend on the specific set of possible layouts permitted for the flexible-page layout. In an embodiment, the maximum number depends on the specific flexible-page layout assigned for viewing content from and associated with the selected one of client applications 108 described in step 1302.

In step 1316, the client displays the newly-received content of step 1312 in an additional panel of a multi-panel layout of the set of possible layouts. In an embodiment, the client selects the multi-panel layout from the set of possible layout. Responsive to selecting the multi-panel layout, the client may, for example, display the newly-received content in the rightmost panel of the multi-panel layout. Then, method proceeds to step 1306.

In an embodiment, the multi-panel layout includes a three-panel layout for concurrently displaying three pieces of content. For example, before step 1316, the multi-panel layout may be displaying a first and second content in a two-panel layout. Then, in step 1316, the client displays the newly-received content of step 1312 in a new third panel. For example, the third panel may be the rightmost panel in the three-panel layout. In this case, the content in the third panel is associated with the content in the middle panel because the client generated the content of the third panel in response to a selection of content in the middle panel during an iteration of step 1308. Similarly, the content in the middle panel is associated with content in the first panel because the client generated the content in the middle panel in response to a selection of a content from the first panel during an earlier iteration of step 1308.

In step 1322, when the client determines that an additional panel is not permitted, the client displays the newly-received content of step 1312 in a single-panel view. For example, FIG. 4 shows that when selectable portions 422C or 422E of respective three-panel layouts 408 and 412 are selected, the client receives content D, e.g., the newly-received content that is displayed in a single-panel view of one-panel layout 418. Then, method 1300 proceeds to step 1306.

Returning to step 1310, when the client determines that no new application is required, method 1300 proceeds to step 1318. In step 1318, the client instructs a previously-downloaded client application to retrieve or generate content for display. In an embodiment, the previously-downloaded client application corresponds to the selected portion of content from step 1308. Subsequently, the client receives new content for display in a similar process as described with respect to step 1312.

In step 1320, the client updates previously-displayed content within a panel with the newly-received content of step 1318. Then, method 1300 proceeds to step 1306.

Figure 14:
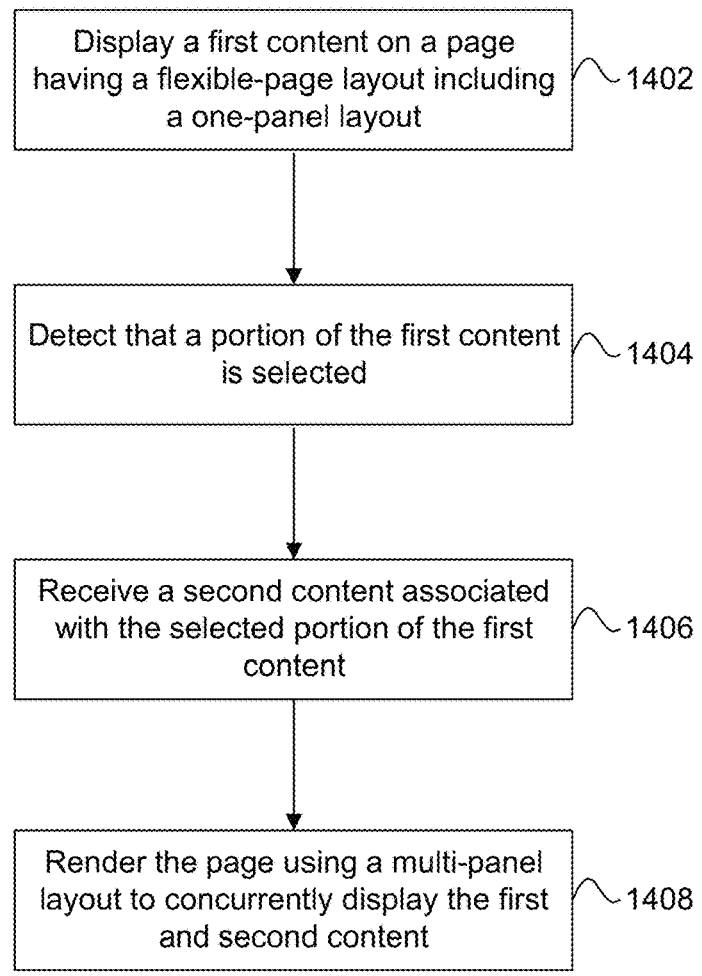
FIG. 14 is a flowchart illustrating a method for forward navigation within a flexible-page layout, according to an example embodiment.

FIG. 14 is a flowchart illustrating a method 1400 for forward navigation within a flexible-page layout, according to an example embodiment. Method 1400 can be performed by processing logic that can comprise hardware (e.g., circuitry, dedicated logic, programmable logic, microcode, etc.), software (e.g., instructions executing on a processing device), or a combination thereof. In an embodiment, a client, such as client 104 from FIG. 1, operating on a display device performs the steps of method 1400. In an embodiment, a display component, such as display component 106 of FIG. 1, within the client performs the steps of method 1400.

In step 1402, the client displays a first content on a page having a flexible-page layout including a one-panel layout. In an embodiment, the first content may be generated or retrieved by a client application within the client, as explained above, for example, with respect to FIG. 1. In an embodiment, when the page uses the one-panel layout, the one panel encompasses the first content.

In an embodiment, the page is associated with a set of possible layouts based on one or more attributes of the display device, as described with respect to FIG. 3. In an embodiment, the set of possible layouts may be predetermined based on the one or more attributes.

For example, the client may select the set of layouts based on a detected width of a display area of the client or a screen area of the display device. In this embodiment, the detected width may be an absolute value, such as a pixel width. In an embodiment, the one-panel layout of step 1402 is selected to be part of the set of possible layouts regardless of the detected width.

In an embodiment, the client determines the types of layouts, particularly the number of panels within a layout, to include in the set of possible layouts by comparing the detected width with one or more width thresholds. For example, the client may determine that the detected width meets or exceeds a first width threshold, e.g., 960 pixels. Responsive to this determination, the client may select two-panel layouts to include in the set of possible layouts. In an example, the client may determine that the detected width meets or exceeds a second width threshold greater than the first width threshold. Responsive to this determination, the client may select three-panel layouts to include in the set of possible layouts.

In step 1404, the client detects that a portion of the first content within the one-panel layout is selected. In an embodiment, the portion is selectable if it is associated with a client application, such as client applications 108 of FIG. 1.

In step 1406, responsive to detecting the selection of the portion, the client receives a second content associated with the selected portion of the first content. In an embodiment, responsive to the detecting of step 1404, the client sends a request to a server to download a second application associated with the selected portion. The server may correspond to, for example, server 114 of FIG. 1. After the server authorizes the download, the client downloads the second application. As explained in FIG. 1, the downloaded second application may be a version of a componentized application stored and managed by the server. Responsive to downloading the second application, the client may instruct the downloaded second application to generate or retrieve the second content. This instructing may cause the client to receive the second content as recited in step 1406.

In step 1408, the client renders the page using a multi-panel layout, from the set of possible layouts, to concurrently display the first and second content. In an embodiment, to concurrently display the first and second content, the client selects the multi-panel layout having a first panel that is vertically adjacent to a second panel to display the first and second content alongside each other. The first and second panels display the first and second content, respectively.

Figure 15:
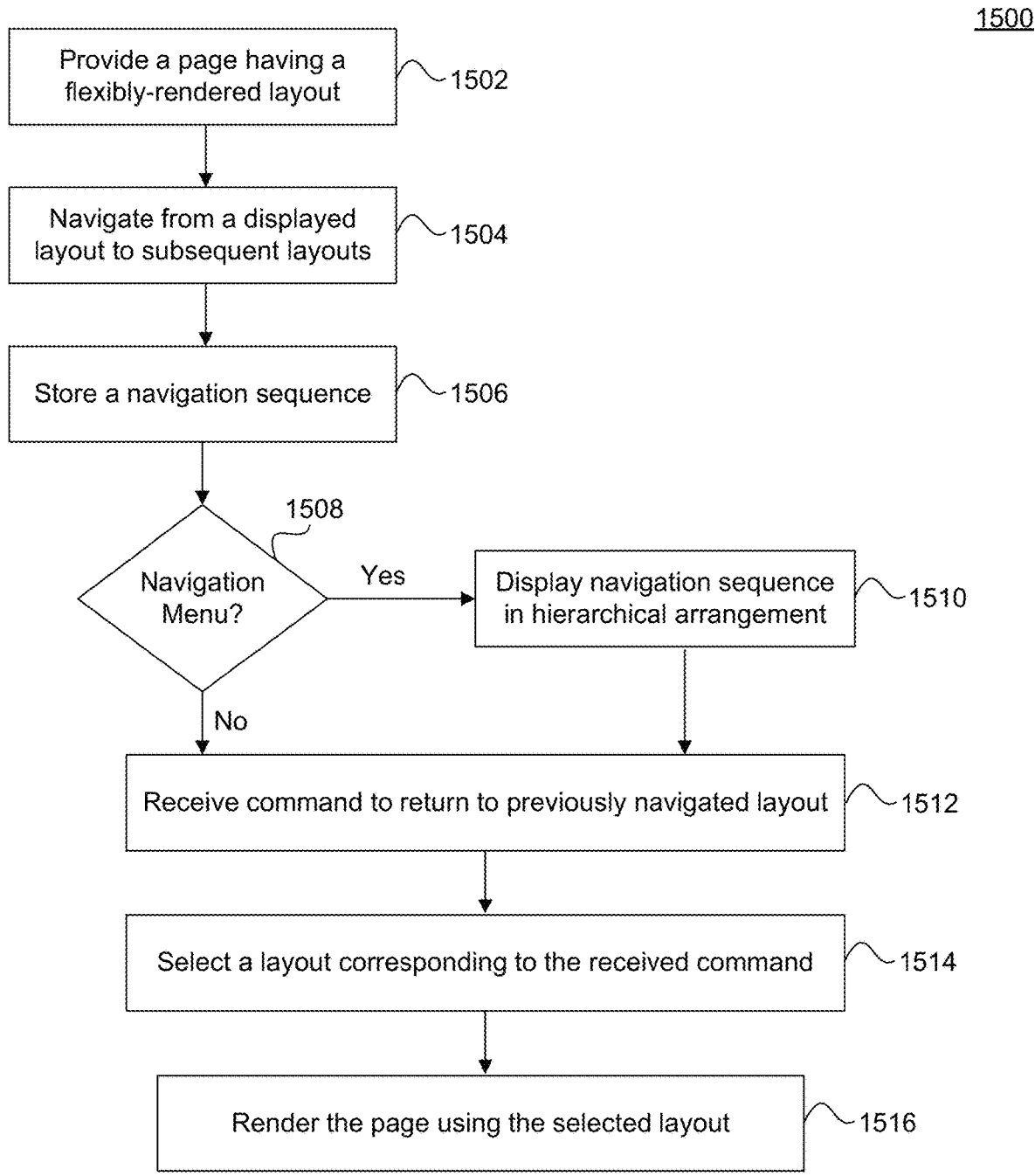
FIG. 15 is a flowchart illustrating a method for backward navigation within a flexible-page layout, according to an example embodiment.

FIG. 15 is a flowchart illustrating a method 1500 for backward navigation within a flexible-page layout, according to an example embodiment. Method 1500 can be performed by processing logic that can comprise hardware (e.g., circuitry, dedicated logic, programmable logic, microcode, etc.), software (e.g., instructions executing on a processing device), or a combination thereof. In an embodiment, a client, such as client 104 from FIG. 1, operating on a display device performs the steps of method 1500. In an embodiment, a display component, such as display component 106 of FIG. 1, within the client performs the steps of method 1500.

In step 1502, the client provides a page having a flexible-page layout for concurrently displaying related content. In an embodiment, the possible layout used to render the page is selected from a set of layouts associated with the page, the display device, or both. For example, as shown in FIG. 4, the client concurrently displays one or more related pieces of content A-D in layouts permitted for the page. In an embodiment and as shown in FIG. 4, each related piece of content A-D is generated from a selection of a portion of a previously-generated related piece of content. Further, one or more of these related pieces of content A-D may be displayed in separate panels in the flexible-page layout.

In step 1504, the client navigates from a displayed layout of the page to subsequent layouts, from the set of layouts. In an embodiment, the client navigates to a subsequent layout responsive to receiving a corresponding selection of a portion of content in the layout previously navigated with respect to that subsequent layout. For example with respect to FIG. 4, the client may navigate from one-panel layout 404 to two-panel layout 406 upon receiving a user's selection of portion 422A of content A. In an embodiment, the client navigates to a single-panel view, e.g., displaying content in a one-panel layout, as a subsequent layout responsive to receiving a user's selection of a toggle GUI element. For example, with respect to FIG. 7, the client may navigate from three-panel layout 712 to one-panel layout 716 as the subsequent layout when the client detects selection of toggle GUI element 722D. Other types of user selections may generate the subsequent layouts. For example, with respect to FIG. 6, the client selects two-panel layout 610 as the subsequent layout when the client receives a selection of panel-width adjustment GUI element 622A.

In step 1506, the client stores a navigation sequence from the displayed layout through one or more of the subsequent layouts. In an embodiment, the client performs step 1506 concurrently with step 1504. As described with respect to FIG. 5, the client may store the navigation sequence in a stack or queue data structure, among other types of data structures. In an embodiment, the navigation sequence includes each of the subsequent layouts. In an embodiment, the navigation sequence excludes certain types of navigated layouts. As described with respect to FIGS. 5 and 11, in an embodiment, the navigation sequence excludes layouts which are toggled from a single-panel view to a multi-panel view. Also described with respect to FIG. 11, in an embodiment, the navigation sequence excludes layouts that are generated to prioritize certain content within a panel, e.g., by selecting a layout having a wider panel to prioritize display of content within the widened panel.

In step 1508, the client determines whether a navigation menu is requested by the user. For example, the user may select page name 216 or corresponding details icon 218 from FIG. 2 to request display of the navigation menu. In an embodiment, as described with respect to FIGS. 2 and 9A-B, the navigation menu permits the user to request the client to navigate to a previously-navigated layout or to quickly access related applications without returning to a "Home" page. Upon determining that the navigation menu is requested, method 1500 proceeds to step 1510. Otherwise, method 1500 proceeds to step 1512. In an embodiment as shown in FIG. 9A, the navigation menu shows previously navigated layouts, which may be single-panel or multi-panel view, as permitted and stored in a navigation sequence. In an embodiment as shown in FIG. 9B, the navigation menu shows single-panel views of previously navigated layouts as permitted and stored in a navigation sequence.

In step 1510, the client displays the stored navigation in a hierarchical arrangement within the navigation menu. In an embodiment, the hierarchical arrangement is in a vertical orientation where a level on one end of the arrangement depicts and represents an immediate previously-navigated layout (as stored in the navigation sequence) and associated page, which is also the most-recently navigated layout.

Within this hierarchical arrangement, another level on the opposite end depicts and represents a least-recently navigated layout and associated page. For example, as shown in FIG. 2, the lowest level, entry 224A, depicting the "Home" page and associated layout, is the least-recently navigated. The highest level, entry 224C, depicting the "App A" page and associated layout is the most-recently navigated. In an embodiment, the client collapses the navigation menu upon determining that the user selects a portion of the page outside of the navigation menu.

In step 1512, the client receives a command to return to a previously-navigated layout from a currently navigated layout. In an embodiment, the command is received as a selection of a back GUI element, such as back GUI element 214 in FIG. 2 or corresponding back GUI elements 522 in FIG. 5. In an embodiment, the command is received as a selection of a level of the hierarchical arrangement displayed in the navigation menu of step 1510, as described with respect to FIG. 9A.

In step 1514, the client selects a layout, from the stored navigation sequence described in step 1506, that corresponds to the received command of step 1512. In an embodiment, when the command is received as a selection of a back GUI element, the client selects the immediate previously-navigated layout from the stored navigation sequence. In an embodiment, when the command is received as a selection of a level in the hierarchical arrangement of step 1510, the client selects a layout represented by the selected level and that corresponds directly to a layout in the stored navigation sequence. In an embodiment, the selected level of step 1510 corresponds to a single-panel view of the layout in the stored navigation sequence, as described with respect to FIG. 9B.

In step 1516, the client renders the page using the selected layout of step 1514.

Figure 16:
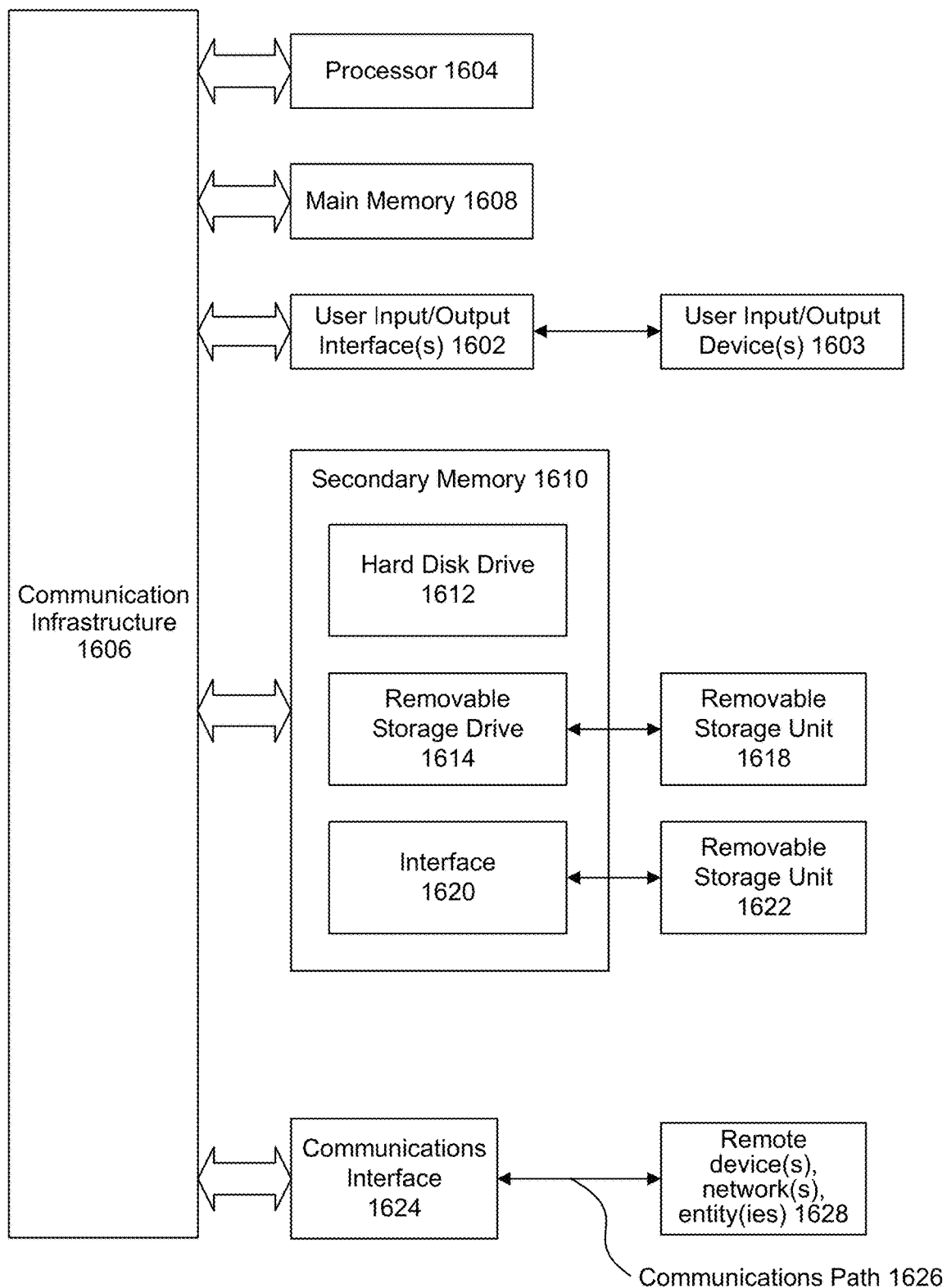
FIG. 16 is an example computer system useful for implementing various embodiments.

Various embodiments can be implemented, for example, using one or more well-known computer systems, such as computer system 1600 shown in FIG. 16. Computer system 1600 can be any well-known computer capable of performing the functions described herein.

Computer system 1600 includes one or more processors (also called central processing units, or CPUs), such as a processor 1604. Processor 1604 is connected to a communication infrastructure or bus 1606.

One or more processors 1604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 also includes user input/output device(s) 1603, such as monitors, keyboards, pointing devices, etc., that communicate with communication infrastructure 1606 through user input/output interface(s) 1602.

Computer system 1600 also includes a main or primary memory 1608, such as random access memory (RAM). Main memory 1608 may include one or more levels of cache. Main memory 1608 has stored therein control logic (i.e., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 includes a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 reads from and/or writes to removable storage unit 1618 in a well-known manner.

According to an exemplary embodiment, secondary memory 1610 may include other means, instrumentalities or other approaches for allowing computer programs and/or other instructions and/or data to be accessed by computer system 1600. Such means, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 enables computer system 1600 to communicate and interact with any combination of remote devices, remote networks, remote entities, etc. (individually and collectively referenced by reference number 1628). For example, communication interface 1624 may allow computer system 1600 to communicate with remote devices 1628 over communications path 1626, which may be wired and/or wireless, and which may include any combination of LANs, WANs, the Internet, etc. Control logic and/or data may be transmitted to and from computer system 1600 via communication path 1626.

In an embodiment, a tangible apparatus or article of manufacture comprising a tangible computer useable or readable medium having control logic (software) stored thereon is also referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 16. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   providing, to a display device, a first layout of a window subdivided into at least a first panel configured to display first content;
   receiving a selection of second content to display in the window;
   determining a maximum number of panels permitted to be displayed within the window based on an orientation of the display device;
   determining that a second panel to be displayed within the window does not exceed the maximum number of panels;
   generating, responsive to the selection of second content and the determination that the maximum number of panels is not exceeded, a second layout of the window subdivided into at least the second panel configured to display the second content concurrently with the first panel displaying the first content, wherein a percentage of screen space of the first panel has been reduced to enable concurrent display of and access to both the first content and the second content in the second layout, and wherein the first and second contents displayed concurrently in the second layout are generated by separate applications;
   storing, by the display device, a layout navigation sequence accessible for both forward and backwards layout navigation, wherein the layout navigation sequence includes an order in which both the first layout and the second layout of panels within the window are accessed, a relative percentage of screen space of the panels within each layout, and relative contents displayed in each panel within each layout, and wherein the first layout and the second layout are different from each other;
   responsive to receiving a command to return to the first layout, selecting the first layout, from the stored layout navigation sequence; and
   rendering, by the display device, the first layout comprising the window subdivided into at least the first panel, wherein the second content is not displayed in the second panel in the window;
   wherein at least one of the providing, receiving, generating, selecting, and rendering are performed by one or more processors in the display device.

2. The method of claim 1, wherein the separate applications are downloaded from a server, wherein each separate application includes graphical user interface (GUI) elements that specify how to display the first and second contents, respectively, and wherein both the first and second contents are independently scrollable.

3. The method of claim 1, wherein the received command is a selection of a back GUI element implemented in the page, wherein the second layout is a currently-displayed layout, and wherein the selected first layout is an immediate previously-navigated layout from which the currently displayed layout is navigated.

4. The method of claim 1, wherein further comprising:
   associating layouts, from the set of layouts, with corresponding Uniform Resource Locators (URLs), wherein the layouts include the first layout, the second layout, and the subsequent layouts; and
   enabling a browser, operating on the display device, to bookmark any layout from the set of layouts using the corresponding URL.

5. The method of claim 1, further comprising:
   displaying, on the page, the stored navigation sequence in a hierarchical arrangement, wherein a first level of the hierarchical arrangement depicts an immediate previously-navigated layout and a second level, farthest from the first level, depicts a least-recently navigated layout.

6. The method of claim 5, wherein the received command is a selection of a level from the displayed hierarchical arrangement, and wherein the selected first layout corresponds to the selected level.

7. The method of claim 1, wherein each panel is configured to be undocked from the window into a separate undocked window, and wherein the separate undocked window is configured to be redocked to the window layout as one of the multiple windows.

8. The method of claim 1, further comprising:
   receiving a selection of third content to display in the window;
   generating, responsive to the selection of third content, a third layout of the window subdivided into at least a third panel configured to display the third content concurrently with the first panel and the second panel, wherein the first and second panels have been size adjusted to enable concurrent display of and access to the first content, second content, and third content in the third layout, wherein the third layout is different from both the first layout and the second layout; and
   storing in the layout navigation sequence, the first layout, the second layout, and the third layout.

9. The method of claim 1, further comprising:
displaying a shell bar comprising navigation controls configured for navigating between the plurality of different layouts.

10. The method of claim 1, further comprising:
receiving a toggle command; and
rendering by the display device, responsive to the toggle command, the second layout of the window including both the first panel and the second panel.

11. The method of claim 1, wherein both the first layout and the second layout include a same number of panels with different percentages of screen space assigned to the same number of panels within each layout.

12. A system, comprising:
a memory; and
at least one processor coupled to the memory and configured to:
provide, to a display device, a first layout of a window subdivided into at least a first panel configured to display first content;
receive a selection of second content to display in the window;
determine a maximum number of panels permitted to be displayed within the window based on an orientation of the display device;
determine that a second panel to be displayed within the window does not exceed the maximum number of panels;
generate, responsive to the selection of second content and the determination that the maximum number of panels is not exceeded, a second layout of the window subdivided into at least the second panel configured to display the second content concurrently with the first panel displaying the first content, wherein a percentage of screen space of the first panel has been reduced to enable concurrent display of and access to both the first content and the second content in the second layout, and wherein the first and second contents displayed concurrently in the second layout are generated by separate applications;
store a layout navigation sequence accessible for both forward and backwards layout navigation, wherein the layout navigation sequence includes an order in which both the first layout and the second layout of panels within the window are accessed, relative percentage of screen space of the panels within each layout, and relative contents displayed in each panel within each layout, and wherein the first layout and the second layout are different from each other;
responsive to receiving a command to return to the first layout, select the first layout, from the stored layout navigation sequence; and
render the first layout comprising the window subdivided into at least the first panel, wherein the second content is not displayed in the second panel in the window.

13. The system of claim 12, wherein the separate applications are downloaded from a server, wherein each separate application includes graphical user interface (GUI) elements that specify how to display the first and second contents, respectively.

14. The system of claim 12, wherein the received command is a selection of a back GUI element implemented in the page, wherein the second layout is a currently-displayed layout, and wherein the selected first layout is an immediate previously-navigated layout from which the currently displayed layout is navigated.

15. The system of claim 12, wherein the received command is a selection of a level from the displayed hierarchical arrangement, and wherein the selected first layout corresponds to the selected level.

16. The system of claim 12, wherein the at least one processor further configured to:
presenting a navigation menu that includes the hierarchical arrangement in a vertical orientation, wherein each level of the hierarchical arrangement represents a corresponding layout from the navigation sequence, and wherein each level is depicted as an icon with a corresponding description indicating the corresponding layout.

17. A non-transitory computer-readable device having instructions stored thereon that, when executed by at least one computing device, causes the at least one computing device to perform operations comprising:
providing, to a display device, a first layout of a window subdivided into at least a first panel configured to display first content;
receiving a selection of second content to display in the window;
determining a maximum number of panels permitted to be displayed within the window based on an orientation of the display device;
determining that a second panel to be displayed within the window does not exceed the maximum number of panels;
generating, responsive to the selection of second content and the determination that the maximum number of panels is not exceeded, a second layout of the window subdivided into at least the second panel configured to display the second content concurrently with the first panel displaying the first content, wherein a percentage of screen space of the first panel has been reduced to enable concurrent display of and access to both the first content and the second content in the second layout, and wherein the first and second contents displayed concurrently in the second layout are generated by separate applications;
storing, by the display device, a layout navigation sequence accessible for both forward and backwards layout navigation, wherein the layout navigation sequence includes an order in which both the first layout and the second layout of panels within the window are accessed, a relative percentage of screen space of the panels within each layout, and relative contents displayed in each panel within each layout, and wherein the first layout and the second layout are different from each other;
responsive to receiving a command to return to the first layout, selecting the first layout, from the stored layout navigation sequence; and
rendering, by the display device, the first layout comprising the window subdivided into at least the first panel, wherein the second content is not displayed in the second panel in the window.

18. The computer-readable device of claim of claim 17, wherein the separate applications are downloaded from a server, wherein each separate application includes graphical user interface (GUI) elements that specify how to display the first and second contents, respectively.

19. The computer-readable device of claim of claim 17, wherein the received command is a selection of a back GUI element implemented in the page, wherein the second layout is a currently-displayed layout, and wherein the selected first layout is an immediate previously-navigated layout from which the currently displayed layout is navigated.

20. The computer-readable device of claim of claim 17, the operations further comprising:
- displaying, on the page, the stored navigation sequence in a hierarchical arrangement, wherein a first level of the hierarchical arrangement depicts an immediate previously-navigated layout and a second level, farthest from the first level, depicts a least-recently navigated layout.

* * * * *